(12) United States Patent
Lostocco et al.

US007772138B2

(10) Patent No.: US 7,772,138 B2
(45) Date of Patent: Aug. 10, 2010

(54) ION SENSITIVE, WATER-DISPERSIBLE POLYMERS, A METHOD OF MAKING SAME AND ITEMS USING SAME

(75) Inventors: Michael R. Lostocco, Appleton, WI (US); W. Clayton Bunyard, De Pere, WI (US); Kelly D. Branham, Winneconne, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 245 days.

(21) Appl. No.: 10/153,232

(22) Filed: May 21, 2002

(65) Prior Publication Data

US 2003/0220042 A1 Nov. 27, 2003

(51) Int. Cl.
*B32B 3/00* (2006.01)
*B32B 5/02* (2006.01)
*D04H 1/00* (2006.01)

(52) U.S. Cl. .......................... 442/59; 442/118; 442/327

(58) Field of Classification Search .................. 442/149, 442/417, 414, 59, 154, 327, 409; 428/364; 525/191
See application file for complete search history.

(56) References Cited

U.S. PATENT DOCUMENTS

| | | |
|---|---|---|
| 2,892,822 A | 6/1959 | Gray et al. |
| 2,982,682 A | 5/1961 | Matlin et al. |
| 3,255,140 A | 6/1966 | Sinn et al. |
| 3,255,141 A | 6/1966 | Damm et al. |
| 3,385,839 A | 5/1968 | Honig et al. |
| 3,480,463 A | 11/1969 | Rankin |
| 3,483,240 A | 12/1969 | Boudreau |
| 3,484,394 A | 12/1969 | Holdstock |
| 3,554,862 A | 1/1971 | Hervey et al. |
| 3,582,519 A | 6/1971 | Gomsi |
| 4,002,171 A | 1/1977 | Taft |
| 4,018,647 A | 4/1977 | Wietsma |
| 4,051,093 A | 9/1977 | Wendel et al. |
| 4,084,033 A | 4/1978 | Drelich |
| 4,117,187 A * | 9/1978 | Adams et al. ............... 442/118 |
| 4,133,684 A | 1/1979 | Tarumi et al. |
| 4,144,122 A | 3/1979 | Emanuelsson et al. |
| 4,186,233 A | 1/1980 | Krajewski et al. |
| 4,220,244 A | 9/1980 | Elmore |
| 4,235,982 A | 11/1980 | Maslanka et al. |
| 4,264,289 A | 4/1981 | Day |
| 4,278,113 A | 7/1981 | Persson |
| 4,352,649 A | 10/1982 | Jacobsen et al. |
| 4,353,687 A | 10/1982 | Nielsen |
| 4,356,229 A | 10/1982 | Brodnyan et al. |
| 4,372,447 A | 2/1983 | Miller |
| 4,443,576 A | 4/1984 | Bhattacharyya et al. |
| 4,476,323 A | 10/1984 | Hellsten et al. |
| RE31,775 E | 12/1984 | Persson |
| 4,491,645 A | 1/1985 | Thompson |
| 4,494,278 A | 1/1985 | Kroyer et al. |
| 4,559,157 A | 12/1985 | Smith et al. |
| 4,592,850 A | 6/1986 | Castner |
| 4,627,806 A | 12/1986 | Johnson |
| 4,640,810 A | 2/1987 | Laursen et al. |
| 4,649,183 A | 3/1987 | McCormick et al. |
| 4,650,409 A | 3/1987 | Nistri et al. |
| 4,667,890 A | 5/1987 | Gietman, Jr. |
| 4,671,888 A | 6/1987 | Yorke |
| 4,678,591 A | 7/1987 | Giddings et al. |
| 4,690,821 A | 9/1987 | Smith et al. |
| 4,711,725 A | 12/1987 | Amick et al. |
| 4,724,980 A | 2/1988 | Farley |
| 4,736,005 A | 4/1988 | Castner |
| 4,737,357 A | 4/1988 | Lehmann et al. |
| 4,741,835 A | 5/1988 | Jacques et al. |
| 4,755,421 A | 7/1988 | Manning et al. |
| 4,820,307 A | 4/1989 | Welch et al. |
| 4,894,118 A | 1/1990 | Edwards et al. |
| 4,936,865 A | 6/1990 | Welch et al. |
| 4,970,260 A | 11/1990 | Lunberg et al. |
| 4,975,209 A | 12/1990 | Welch et al. |
| 4,975,320 A | 12/1990 | Goldstein et al. |
| 5,049,440 A | 9/1991 | Bornhoeft, III et al. |
| 5,104,923 A | 4/1992 | Steinwand et al. |
| 5,204,104 A | 4/1993 | Bolinger et al. |

(Continued)

FOREIGN PATENT DOCUMENTS

DE          1 719 395        12/1970

(Continued)

OTHER PUBLICATIONS

Lambourne, R. et al, Paint and Surface Coatings: Theory and Practice, 1999.*
Slone, "Acrylic Ester Polymers" Encyclopedia of Polymer Science and Technology, Copyright 2002 John Wiley and Sons, online posting date Oct. 22, 2001.*
Kohlhammer, Klaus, "New airlaid binders", *Nonwovens Report International*, Sep. 1999, Issue 342, pp. 20-22 and 28-31.
Lee, Seungsin et al., "Antimicrobial and Blood Repellent Finishes for Cotton and Nonwoven Fabrics Based on Chitosan and Fluoropolymers", *Textile Res. J.*, vol. 69, No. 2, 1999, pp. 104-112.
"New Chemical Perspectives", *Soap and Cosmetics*, vol. 76, No. 3. Mar. 2000, pp. 12.

(Continued)

*Primary Examiner*—Rena L Dye
*Assistant Examiner*—Jennifer Steele
(74) *Attorney, Agent, or Firm*—R. Joseph Foster, III

(57) ABSTRACT

The present invention is directed to ion-sensitive, hard water dispersible polymers. The present invention is also directed to a method of making ion-sensitive, hard water dispersible polymers and their applicability as binder compositions. The present invention is further directed to fiber-containing fabrics and webs comprising ion-sensitive, hard water dispersible binder compositions and their applicability in water dispersible personal care products.

10 Claims, No Drawings

U.S. PATENT DOCUMENTS

| | | | |
|---|---|---|---|
| 5,221,285 A | 6/1993 | Andrews et al. | |
| 5,281,306 A * | 1/1994 | Kakiuchi et al. | 162/158 |
| 5,300,192 A | 4/1994 | Hansen et al. | |
| 5,312,883 A | 5/1994 | Komatsu et al. | |
| 5,317,063 A | 5/1994 | Komatsu et al. | |
| 5,360,826 A | 11/1994 | Egolf et al. | |
| 5,362,565 A | 11/1994 | Murano | |
| 5,384,189 A | 1/1995 | Kuroda et al. | |
| 5,397,672 A | 3/1995 | Larson et al. | |
| 5,399,412 A | 3/1995 | Sudall et al. | |
| 5,427,899 A | 6/1995 | Avison et al. | |
| 5,429,686 A | 7/1995 | Chiu et al. | |
| 5,441,841 A | 8/1995 | Larson et al. | |
| 5,459,007 A | 10/1995 | Larson et al. | |
| 5,509,913 A | 4/1996 | Yeo | |
| 5,516,432 A | 5/1996 | King et al. | |
| 5,518,585 A | 5/1996 | Huth et al. | |
| 5,525,449 A | 6/1996 | Spiewak et al. | |
| 5,573,637 A | 11/1996 | Ampulski et al. | |
| 5,607,551 A | 3/1997 | Farrington, Jr. et al. | |
| 5,607,908 A | 3/1997 | Potini et al. | |
| 5,631,317 A | 5/1997 | Komatsu et al. | |
| 5,648,083 A | 7/1997 | Blieszner et al. | |
| 5,672,248 A | 9/1997 | Wendt et al. | |
| 5,756,625 A | 5/1998 | Crandall et al. | |
| 5,804,203 A | 9/1998 | Hahn et al. | |
| 5,891,126 A | 4/1999 | Osborn, III et al. | |
| 5,928,783 A * | 7/1999 | Phan et al. | 428/355 EN |
| 5,952,232 A | 9/1999 | Rothman | |
| 5,954,921 A | 9/1999 | Dahmen et al. | |
| 5,968,286 A | 10/1999 | Crudele et al. | |
| 5,986,004 A | 11/1999 | Pomplun et al. | |
| 5,993,849 A | 11/1999 | Assmus et al. | |
| 5,997,952 A | 12/1999 | Harris et al. | |
| 6,007,585 A | 12/1999 | Syed et al. | |
| 6,037,407 A | 3/2000 | Derian et al. | |
| 6,043,317 A | 3/2000 | Mumick et al. | |
| 6,051,749 A | 4/2000 | Schulz | |
| 6,093,410 A | 7/2000 | Peffly et al. | |
| 6,103,245 A | 8/2000 | Clark et al. | |
| 6,121,170 A | 9/2000 | Tsai et al. | |
| 6,127,593 A | 10/2000 | Bjorkquist et al. | |
| 6,218,492 B1 | 4/2001 | Hill et al. | |
| 6,238,683 B1 | 5/2001 | Burnett et al. | |
| 6,291,372 B1 | 9/2001 | Mumick et al. | |
| 6,294,186 B1 | 9/2001 | Beerse et al. | |
| 6,294,645 B1 | 9/2001 | Allen et al. | |
| 6,358,365 B1 | 3/2002 | Zhang et al. | |
| 6,379,501 B1 | 4/2002 | Zhang et al. | |
| 6,423,801 B1 | 7/2002 | Hahn et al. | |
| 6,423,804 B1 | 7/2002 | Chang et al. | |
| 6,429,261 B1 | 8/2002 | Lang et al. | |
| 6,436,234 B1 | 8/2002 | Chen et al. | |
| 6,444,214 B1 | 9/2002 | Cole et al. | |
| 6,458,230 B1 | 10/2002 | Rupaner et al. | |
| 6,537,663 B1 | 3/2003 | Chang et al. | |
| 6,548,592 B1 | 4/2003 | Lang et al. | |
| 6,562,892 B2 * | 5/2003 | Eknoian et al. | 524/457 |
| 6,579,570 B1 | 6/2003 | Lang et al. | |
| 6,599,848 B1 | 7/2003 | Chen et al. | |
| 6,602,955 B2 | 8/2003 | Soerens et al. | |
| 6,630,558 B2 | 10/2003 | Chang et al. | |
| 6,653,406 B1 | 11/2003 | Soerens et al. | |
| 6,683,129 B1 * | 1/2004 | Eknoian | 524/547 |
| 6,683,143 B1 | 1/2004 | Mumick et al. | |
| 6,713,414 B1 | 3/2004 | Pomplun et al. | |
| 2001/0055619 A1 | 12/2001 | Petereit et al. | |
| 2002/0081930 A1 | 6/2002 | Jackson et al. | |
| 2002/0111450 A1 | 8/2002 | Chang et al. | |
| 2002/0155281 A1 | 10/2002 | Lang et al. | |
| 2002/0176877 A1 | 11/2002 | Cole et al. | |
| 2003/0008591 A1 | 1/2003 | Parsons et al. | |
| 2003/0022568 A1 | 1/2003 | Branham et al. | |
| 2003/0026963 A1 | 2/2003 | Chang et al. | |
| 2003/0027470 A1 | 2/2003 | Chang et al. | |
| 2003/0032352 A1 | 2/2003 | Chang et al. | |
| 2003/0045645 A1 | 3/2003 | Chang et al. | |
| 2003/0055146 A1 | 3/2003 | Chang et al. | |
| 2003/0072950 A1 | 4/2003 | Rodrigues et al. | |
| 2003/0105257 A1 | 6/2003 | Chang et al. | |
| 2003/0220042 A1 | 11/2003 | Lostocco et al. | |
| 2004/0030080 A1 | 2/2004 | Chang et al. | |
| 2004/0055704 A1 | 3/2004 | Bunyard et al. | |
| 2004/0058073 A1 | 3/2004 | Bunyard et al. | |
| 2004/0058600 A1 | 3/2004 | Bunyard et al. | |
| 2004/0058606 A1 | 3/2004 | Branham et al. | |
| 2004/0062791 A1 | 4/2004 | Branham et al. | |
| 2004/0063888 A1 | 4/2004 | Bunyard et al. | |

FOREIGN PATENT DOCUMENTS

| | | | |
|---|---|---|---|
| EP | 0 206 489 A2 | | 12/1986 |
| EP | 0 256 144 A2 | | 2/1988 |
| EP | 0 260 108 A1 | | 3/1988 |
| EP | 0 355 254 A1 | | 2/1990 |
| EP | 0 408 199 A1 | | 1/1991 |
| EP | 0 416 427 A1 | | 3/1991 |
| EP | 0 525 671 A1 | | 2/1993 |
| EP | 0 601 518 A1 | | 6/1994 |
| EP | 0 608 460 A1 | | 8/1994 |
| EP | 0 620 256 A1 | | 10/1994 |
| EP | 0 634 284 A1 | | 1/1995 |
| EP | 0 678 397 A1 | | 10/1995 |
| EP | 0765960 A2 | | 4/1997 |
| EP | 0 807 704 A1 | | 11/1997 |
| EP | 0 937 453 A2 | | 8/1999 |
| EP | 1 215 324 A2 | | 6/2002 |
| FR | 2 807 760 A1 | | 10/2001 |
| GB | 1 462 441 | | 1/1977 |
| GB | 1 549 032 | | 8/1979 |
| GB | 2 241 373 A | | 8/1991 |
| JP | 51003248 | | 1/1976 |
| JP | 56-035703 | | 4/1981 |
| JP | 60/220137 | | 11/1985 |
| JP | 04/046915 | | 2/1992 |
| JP | 04/309510 | | 11/1992 |
| JP | 06-192527 | | 7/1994 |
| JP | 06-207162 | | 7/1994 |
| JP | 06-233809 | | 8/1994 |
| JP | 10/204792 | | 8/1998 |
| US | 200183866 A2 * | | 11/2001 |
| WO | WO 90/15830 A1 | | 12/1990 |
| WO | WO 96/12615 A1 | | 5/1996 |
| WO | WO 97/10100 A1 | | 3/1997 |
| WO | WO 98/26808 A2 | | 6/1998 |
| WO | WO 98/29501 A1 | | 7/1998 |
| WO | WO 98/41577 A1 | | 9/1998 |
| WO | WO 98/52698 A1 | | 11/1998 |
| WO | WO 98/53006 A1 | | 11/1998 |
| WO | WO 00/38751 A1 | | 7/2000 |
| WO | WO 00/39378 A2 | | 7/2000 |
| WO | WO 01/83866 A2 * | | 5/2001 |
| WO | WO 01/82986 A2 | | 11/2001 |
| WO | WO 01/83572 A1 | | 11/2001 |
| WO | WO 01/83573 A1 | | 11/2001 |
| WO | WO 01/83866 A2 | | 11/2001 |
| WO | WO 01/83867 A2 | | 11/2001 |
| WO | WO0183866 * | | 11/2001 |
| WO | WO 02/077040 A2 | | 10/2002 |
| WO | WO 02/077041 A2 | | 10/2002 |
| WO | WO 02/077042 A2 | | 10/2002 |
| WO | WO 02/077048 A2 | | 10/2002 |
| WO | WO 02/077345 A2 | | 10/2002 |

WO    WO 02/077365 A2    10/2002

OTHER PUBLICATIONS

Andrews B.A.K., "Nonformaldehyde DP Finishing of Cotton with Citric Acid", *Textile Chem. Color*, vol. 22, No. 8, pp. 63-67, 1990.

Caulfield, D., "Ester Crosslinking to Improve Wet Performance of Paper Using Multifunctional Carboxylic Acids, Butanetetracarboxylic and Citric Acid", *Tappi J*, vol. 77 No. 3, pp. 205-212, 1994.

Eisenberg, A., et al., "Dehydration Kinetics and Galss Transistion of Poly(acrylic Acid)", *J. Polym. Sci. Part A-1*, 7, pp. 1717-1728, 1969.

Igarashi, S., "Representation of Composition and Blockiness of the Copolymer by a Triangula Coordinate System", *Polymer Letter*, vol. 1, pp. 359-363, 1963.

Koda, S. et al., "Raman Spectroscopic Studies on the Interaction Between Divalent Counterion and Polyion", *Biophys. Chem.*, vol. 18, pp. 361-367, 1983.

Levine, H.J. et al., "Divalent Cation Binding Specificities and Microsphere Formation of Pyran Copolymer and Related Polycarboxylates", *Arch. Biochem. And Biophys.*, vol. 184, pp. 156-165, 1977.

Mao, Z. et al., "Polymeric Multifunctional Carboxylic Acids as Crosslinking Agents for Cotton Cellulose: Poly(itaconic acid) and In Situ Polymerization of Itaconic Acid", *J. Appl. Polym. Sci.*, vol. 79, pp. 319-326, 2001.

Welch, C.M., "Tretracarboxylic Acids as Formaldehyde-Free Durable Press Finishing Agents", *Textile Res. J.*, vol. 58, pp. 480-485, 1988.

Yang C.Q., Infared Spectroscopy Studies of the Effects of the Catalyst on the Ester Cross-Linking of Cellulose by Poly(carboxylic Acids) *J. Appl. Polym. Sci.*, vol. 50, pp. 2047-2053, 1993.

Yang, C.Q. et al., "Infrared Spectroscopy Studies of the Cyclic Anhydride as the Intermediate for the Ester Crosslinking of Cotton Cellulose by Polycarboxylic Acids. III. Molucular Weight of a Crosslinking Agent", *J. Polym. Sci., Part A, Polym. Chem.*, vol. 35, pp. 557-564, 1997.

Yang, C.Q. et al., "Nonformaldehyde Durable Press Finishing of Cotton Fabrics by Combining Citric Acid with Polymers of Maleic Acid", *Textile Res. J.*, vol. 68, No. 5, pp. 457-464, 1998.

Yang, C.Q. et al., "Paper Wet Performance and Ester Crosslinking of Wood Pulp Cellulose by Poly(carboxylic acids)s", *J. Appl. Polym. Sci.*, vol. 67, pp. 649-658, 1998.

Yang, C.Q., "Infrared Spectroscopy Studies of the Cyclic Anhydride as the Intermediate for the Ester Crosslinking of Cotton Cellulose by Polycarboxylic Acides. I. Identification of the Cyclic Anhydride Intermediate", *J. Polym. Sci. Part A, Polym. Chem.*, vol. 31, pp. 1187-1193, 1993.

Zhou, Y.J. et al., "Mechanism of Crosslinking of Papers with Polyfunctional Carboxylic Acids", *J. Appl. Polym. Sci.*, vol. 58, pp. 1523-1534, 1995.

* cited by examiner

ION SENSITIVE, WATER-DISPERSIBLE POLYMERS, A METHOD OF MAKING SAME AND ITEMS USING SAME

FIELD OF THE INVENTION

The present invention is directed to ion-sensitive, water-dispersible polymer formulations. The present invention is also directed to a method of making ion-sensitive, water-dispersible polymer formulations and their applicability as binder compositions for disposable items. The present invention is further directed to disposable items, such as wet-wipes comprising ion-sensitive, water-dispersible binder compositions.

BACKGROUND OF THE INVENTION

For many years, the problem of disposability has plagued industries which provide disposable items, such as, diapers, wet wipes, incontinent garments and feminine care products. While much headway has been made in addressing this problem, one of the weak links has been the inability to create an economical coherent fibrous web, which will readily dissolve or disintegrate in water, but still have sufficient in-use strength. See, for example, U.K. patent disclosure 2,241,373 and U.S. Pat. No. 4,186,233. Without such a product, the ability of the user to dispose of the product by flushing it down the toilet is greatly reduced, if not eliminated. Furthermore, the ability of the product to disintegrate in a landfill is quite limited because a large portion of the product components, which may well be biodegradable or photodegradable, are encapsulated in or bound together by plastic which degrades over a long period of time, if at all. Accordingly, if the plastic disintegrated in the presence of water, the internal components could degrade as a result of the rupture of the plastic encapsulation or binding. Such characteristics would be attractive for use within flushable personal care products (i.e.—diapers, feminine care products, adult incontinence products, etc.).

Usually such products comprise a body side liner which must rapidly pass fluids, such as urine or menses, so that the fluid may be absorbed by an absorbent core of the product. Typically, the body side liner may be a coherent fibrous web, which desirably possesses a number of characteristics, such as softness and flexibility. The fibrous web of the body side liner material may be typically formed by wet or dry (air) laying a generally random plurality of fibers and joining them together to form a coherent web with a binder composition. Past binder compositions have performed this function well. However, fibrous webs comprising these compositions tended to be non-dispersible and present problems in typical household sanitation systems.

Recent binder compositions have been developed which can be more dispersible and are more environmentally compatible than past binder compositions. One class of binder compositions includes polymeric materials having inverse solubility in water. These binder compositions are insoluble in warm water, but are soluble in cold water. This behavior in cold water may be appealing for toilet disposal. It is well known that a number of polymers exhibit cloud points or inverse solubility properties in aqueous media. These polymers have been cited in several publications for various applications, including (1) as evaporation retarders (JP 6207162); (2) as temperature sensitive compositions, which are useful as temperature indicators due to a sharp color change associated with a corresponding temperature change (JP 6192527); (3) as heat sensitive materials that are opaque at a specific temperature and become transparent when cooled to below the specific temperature (JP 51003248 and JP 81035703); (4) as wound dressings with good absorbing characteristics and easy removal (JP 6233809); and (5) as materials in flushable personal care products (U.S. Pat. No. 5,509,913 issued to Richard S. Yeo on Apr. 23, 1996 and assigned to Kimberly-Clark Corporation).

Other recent binders of interest include a class of binders, which are ion-sensitive. Several U.S. and European patents assigned to Lion Corporation of Tokyo, Japan, disclose ion-sensitive polymers comprising acrylic acid and alkyl or aryl acrylates. See U.S. Pat. Nos. 5,312,883, 5,317,063 and 5,384,189, the disclosures of which are incorporated herein by reference, as well as, European Pat. No. 608460A1. In U.S. Pat. No. 5,312,883, terpolymers are disclosed as suitable binders for flushable nonwoven webs. The disclosed acrylic acid-based terpolymers, which comprise partially neutralized acrylic acid, butyl acrylate and 2-ethylhexyl acrylate, are suitable binders for use in flushable nonwoven webs in some parts of the world. However, because of the presence of a small amount of sodium acrylate in the partially neutralized terpolymer, these binders fail to disperse in water containing more than about 15 ppm $Ca^{2+}$ and/or $Mg^{2+}$. When placed in water containing more than about 15 ppm $Ca^{2+}$ and/or $Mg^{2+}$ ions, nonwoven webs using the above-described binders maintain a tensile strength greater than 30 g/in, which negatively affects the "dispersibility" of the web. The proposed mechanism for the failure is that each calcium ion binds with two carboxylate groups either intramolecularly or intermolecularly. Intramolecular association causes the polymer chain to coil up, which eventually leads to polymer precipitation. Intermolecular association yields crosslinking. Whether intramolecular or intermolecular associations are taking place, the terpolymer is not soluble in water containing more than about 15 ppm $Ca^{2+}$ and/or $Mg^{2+}$. Due to the strong interaction between calcium ions and the carboxylate groups of the terpolymer, dissociation of the complex is highly unlikely because this association is irreversible. Therefore, the above-described polymer that has been exposed to a high $Ca^{2+}$ and/or $Mg^{2+}$ concentration solution will not disperse in water even if the calcium concentration decreases. This limits the application of the polymer as a flushable binder material because most areas across the U.S. have hard water, which contains more than 15 ppm $Ca^{2+}$ and/or $Mg^{2+}$.

In a co-pending application assigned to Kimberly Clark; i.e., U.S. patent application Ser. No. 09/223,999, filed Dec. 31, 1998, the disclosure of which is incorporated herein by reference, there is disclosed a modification of the acrylic acid terpolymers of the above-referenced patents to Lion Corporation. Specifically, U.S. patent application Ser. No. 09/223,999 discloses sulfonate anion-modified acrylic acid terpolymers which have improved dispersibility in relatively hard water; e.g., up to 200 ppm $Ca^{2+}$ and/or $Mg^{2+}$, compared to the unmodified Lion polymers. However, the Lion Corporation ion-sensitive polymers of the above-referenced patents and the sulfonate anion modified acrylic acid terpolymers of the co-pending application, when used as binders for personal care products, such as wet wipes, typically have reduced sheet wettability, increased sheet stiffness, increased sheet stickiness, reduced binder sprayability and relatively high product cost.

Another approach to dispersible personal care products is disclosed in U.S. Pat. No. 5,281,306 to Kao Corporation of Tokyo, Japan. This patent discloses a water-disintegratable cleansing sheet; i.e., wet wipe, comprising water-dispersible fibers treated with a water-soluble binder having a carboxyl group. The cleansing sheet is treated with a cleansing agent containing 5%-95% of a water-compatible organic solvent and 95%-5% water. A preferred organic solvent is propylene glycol. The cleansing sheet retains wet strength and does not disperse in the organic solvent-based cleansing agent, but disperses in water.

Although many patents disclose various ion and temperature sensitive compositions for water-dispersible or flushable materials, there exists a need for dispersible products possessing softness, flexibility, three dimensionality, and resiliency. These properties should be coupled with wicking and structural integrity in the presence of body fluids (including feces) at body temperature. This integrity must be lost after toilet flushing so that fibers do not become entangled with tree roots or provide point of clogging at bends in sewer pipes.

In addition, the known ion-sensitive polymers, such as those of Lion Corporation and the co-pending application of Kimberly Clark, have relatively high viscosities at high shear rates that make application by spraying difficult. Moreover, there is a need in the art for flushable products having water-dispersibility in all areas of the world, including soft and hard water areas. Furthermore, there is a need for water-dispersible binders that do not reduce wettability of product with which they are used and are sprayable for easy and uniform application to and penetration into products. There is also a need for a water-dispersible, binder polymer for use in flushable wet wipe which polymer has a lower carboxylate functionality and a reduced amount of acid than previous binder polymers. Finally, there is a need for water-dispersible, flushable wet wipes that are stable during storage and retain a desired level of wet strength during use and are wetted with a wetting composition that is relatively free, or is substantially free, of organic solvents. Such a product is needed at a reasonable cost without compromising product safety and environmental concerns, something that past products have failed to do.

SUMMARY OF THE INVENTION

The present invention is directed to ion-sensitive polymer formulations, which have been developed to address the above-described problems associated with currently available, ion-sensitive polymers and other polymers described in literature. The ion-sensitive polymer formulations of the present invention have a "trigger property," such that the polymers are insoluble in a wetting composition comprising ions of a particular type and concentration, such as monovalent and/or divalent salt solutions at a concentration from about 0.3% to 10%, but can be soluble when diluted with water. This water may contain up to about 200 ppm parts per million) calcium and/or magnesium ions. Unlike some ion-sensitive polymer formulations, which lose dispersibility in hard water because of ion cross-linking by calcium ions, the polymer formulations of the present invention are relatively insensitive to calcium and/or magnesium ions. Consequently, flushable products containing the polymer formulations of the present invention maintain dispersibility in hard water.

The polymer formulations of the present invention are useful as binders and structural components for air-laid and wet-laid nonwoven fabrics for applications such as body-side liners, fluid distribution materials, fluid in-take materials (surge) or cover stock in various personal care products. The polymer formulations of the present invention are particularly useful as a binder material for flushable personal care products, medical care, automotive care, etc. The wipes containing the polymer formulations of the present invention may comprise cleaning agents, disinfectants and the like. The flushable products maintain integrity or wet strength during storage and use, and break apart or disperse after disposal in the toilet when the salt concentration falls below a critical level. Suitable substrates for treatment include tissue, such as creped or uncreped tissue, coform products, hydroentangled webs, airlaid mats, fluff pulp, nonwoven webs, and composites thereof. Methods for producing uncreped tissues and molded three-dimensional tissue webs of use in the present invention can be found in commonly owned U.S. patent application Ser. No. 08/912,906, "Wet Resilient Webs and Disposable Articles Made Therewith," by F. J. Chen et al., filed Aug. 15, 1997; U.S. Pat. No. 5,429,686, issued to Chiu et al. on Jul. 4, 1995; U.S. Pat. No. 5,399,412, issued to S. J. Sudall and S. A. Engel on Mar. 21, 1995; U.S. Pat. No. 5,672,248, issued to Wendt et al. on Sep. 30, 1997; and U.S. Pat. No. 5,607,551, issued to Farrington et al. on Mar. 4, 1997; all of which are herein incorporated in their entirety by reference. The molded tissue structures of the above patents can be especially helpful in providing good cleaning in a wet wipe. Good cleaning can also be promoted by providing a degree of texture in other substrates as well by embossing, molding, wetting and through-air drying on a textured fabric, and the like.

Airlaid material can be formed by metering an airflow containing the fibers and other optional materials, in substantially dry condition, onto a typically horizontal-moving wire forming screen. Suitable systems and apparatus for air-laying mixtures of fibers and thermoplastic material are disclosed in, for example, U.S. Pat. No. 4,157,724 (Persson), issued Jun. 12, 1979, and reissued Dec. 25, 1984 as Re. U.S. Pat. No. 31,775; U.S. Pat. No. 4,278,113 (Persson), issued Jul. 14, 1981; U.S. Pat. No. 4,264,289 (Day), issued Apr. 28, 1981; U.S. Pat. No. 4,352,649 (Jacobsen et al.), issued Oct. 5, 1982; U.S. Pat. No. 4,353,687 (Hosler, et al.), issued Oct. 12, 1982; U.S. Pat. No. 4,494,278 (Kroyer, et al.), issued Jan. 22, 1985; U.S. Pat. No. 4,627,806 (Johnson), issued Dec. 9, 1986; U.S. Pat. No. 4,650,409 (Nistri, et al.), issued Mar. 17, 1987; and U.S. Pat. No. 4,724,980 (Farley), issued Feb. 16, 1988; and U.S. Pat. No. 4,640,810 (Laursen et al.), issued Feb. 3, 1987.

The present invention also discloses how to make water-dispersible nonwovens, including cover stock (liner), intake (surge) materials and wet wipes, which are stable in fluids having a first ionic composition, such as monovalent and/or divalent ions at a particular concentration substantially greater than is found in typical hard water, using the above-described unique polymer formulations as binder compositions. The resultant nonwovens are flushable and water-dispersible due to the tailored ion sensitivity, which can be triggered regardless of the hardness of water found in toilets throughout the United States and the world.

The present invention further discloses an improved wetting composition for wet wipes. Wet wipes employing the polymer formulations of the present invention are stable during storage and retain a desired level of wet strength during use and are wetted with a wetting composition or cleaning agent that can be relatively free, or is substantially free, of organic solvents.

Other object, features and advantages of the present invention will become apparent after a review of the following detailed description of the disclosed embodiments and the appended claims.

DETAILED DESCRIPTION OF THE DISCLOSED EMBODIMENTS

In order to be effective ion-sensitive formulations suitable for use in flushable or water-dispersible personal care products, the formulations should desirably be (1) functional; i.e., maintain wet strength under controlled conditions and dissolve or disperse rapidly in soft or hard water such as that found in toilets and sinks around the world; (2) safe (not toxic); and (3) relatively economical. In addition to the foregoing factors, the ion-sensitive formulations when used as a binder composition for a non-woven substrate, such as a wet wipe, desirably should be (4) processable on a commercial basis; i.e., may be applied relatively quickly on a large scale basis, such as by spraying, which thereby requires that the binder composition have a relatively low viscosity at high shear; (5) provide acceptable levels of sheet or substrate wettability; and (6) provide improved product feel, such as improved product flexibility and reduced stickiness. The wetting composition with which the wet wipes of the present invention are treated can provide some of the foregoing advantages, and, in addition, can provide one or more of (7) improved skin care, such as reduced skin irritation or other benefits, (8) improved tactile properties, and (9) promote good cleaning by providing a balance in use between friction and lubricity on the skin (skin glide). The ion-sensitive polymer formulations of the present invention and articles made therewith, especially wet wipes comprising particular wetting compositions set forth below, can meet many or all of the above criteria. Of course, it is not necessary for all of the advantages of the preferred embodiments of the present invention to be met to fall within the scope of the present invention.

As used herein, the term "soft water" refers to water having a divalent ion content of less than about 10 ppm. As used herein, the term "moderately hard water" refers to water having a divalent ion content of from about 10 to about 50 ppm. As used herein, the term "hard water" refers to water having a divalent ion content of more than about 50 ppm up to about 200 ppm. By controlling the hydrophobic/hydrophilic balance and the composition of the polymers as well as the combination of polymers forming the formulation, the ion-sensitive polymer formulations having desired in-use binding strength and water-dispersibility in water are produced. The ion-sensitive polymer can be a copolymer, such as terpolymers or tetrapolymers.

Ion-sensitive Polymer

Ion-sensitive polymers of the present invention may comprise any combination of a sulfonate-containing monomer, one or more alkyl acrylate monomers and an anhydride/dicarboxylate monomer capable of free radical polymerization into a copolymer and, specifically, a terpolymer or tetrapolymer. The relative amounts of the monomers in the acrylate copolymer of the present invention may vary depending on the desired properties in the resulting polymer. The mole percent of acrylate monomer in the copolymer is up to about 90 mole percent. More specifically, the mole percent of acrylate monomer in the copolymer is from about 60 to about 90 mole percent.

The sulfonate-containing monomers are softer than carboxylate anions since the negative charge of the sulfonate anion is delocalized over three oxygen atoms and a larger sulfur atom, as opposed to only two oxygen atoms and a smaller carbon atom in the carboxylate anion. These monomers, containing the softer sulfonate anion, are less interactive with multivalent ions present in hard water, particularly $Ca^{2+}$ and $Mg^{2+}$ ions. Suitable sulfonate-containing monomers include, but are not limited to, 2-acrylamido-2-methyl-1-propanesulfonic acid (AMPS) as well as organic or inorganic salts of 2-acrylamido-2-methyl-1-propanesulfonic acid, such as alkali earth metal and organic amine salts of 2-acrylamido-2-methyl-1-propanesulfonic acid, particularly the sodium salt of 2-acrylamido-2-methyl-1-propanesulfonic acid (NaAMPS). Additional suitable sulfonate-containing monomers include, but are not limited to, 2-methyl-2-propene sulfonic acid, vinyl sulfonic acid, styrene sulfonic acid, 3-sulfopropyl methacrylate and 3-sulfopropyl acrylate, as well as organic or inorganic salts thereof, such as alkali earth metals and organic amine salts, such as alkyl ammonium hydroxide wherein the alkyl groups are $C_1$-$C_{18}$.

To maintain the hydrophobic/hydrophilic balance of the ion-sensitive polymer, one or more hydrophobic alkyl acrylate monomers are added to the polymer. Alkyl acrylates suitable for use in the present invention include alkyl acrylates having alkyl groups of $C_1$-$C_{12}$ and include, but are not limited to, methyl acrylate, ethyl acrylate, butyl acrylate and 2-ethylhexyl acrylate.

The ion-sensitive polymer of the present invention also includes anhydride/dicarboxylate monomers. Suitable carboxylic acid anhydride monomers include, but are not limited to, itaconic anhydride, maleic anhydride, and fumaric anhydride.

Desirably, the ion-sensitive polymers of the present invention are produced from: AMPS, NaAMPS or a combination thereof; butyl acrylate and/or methyl acrylate and itaconic anhydride.

Desirably, the monomers are present in the polymer of the present invention at the following mole percents: sulfonate containing monomer about 5 to about 10 mol %; alkyl acrylate about 48 to about 90 mole percent; anhydride/dicarboxylate about 2 to about 7 mol %. More specifically, the monomers are present in the polymer of the present invention at the following mole percents: 5 to about 10 mol % 2-acrylamido-2-methyl-1-propanesulfonic acid; from about 48 to about 88 mol % butyl acrylate; from about 15 to about 40 mol % methyl acrylate and from about 2 to about 7 mol % anhydride/dicarboxylate. Most specifically, the monomers are present in the polymer of the present invention at the following mole percents: 5 mol % 2-acrylamido-2-methyl-1-propanesulfonic acid, from about 48 to about 88 mol % butyl acrylate; from about 15 to about 40 mol % methyl acrylate and from about 3 to about 5 mol % itaconic anhydride.

The polymers of the present invention may have an average molecular weight, which varies depending on the ultimate use of the polymer. The polymers of the present invention have a weight average molecular weight ranging from about 10,000 to about 5,000,000. More specifically, the polymers of the present invention have a weight average molecular weight ranging from about 25,000 to about 2,000,000, or, more specifically still, from about 200,000 to about 1,000,000.

The polymers of the present invention may be prepared according to a variety of polymerization methods, most notably a solution polymerization method. Suitable solvents for the polymerization method include, but are not limited to, lower alcohols such as methanol, ethanol and propanol; a mixed solvent of water and one or more lower alcohols mentioned above; and a mixed solvent of water and one or more lower ketones such as acetone or methyl ethyl ketone.

In the polymerization methods of the present invention, any polymerization initiator may be used. Selection of a particular initiator may depend on a number of factors including, but not limited to, the polymerization temperature, the solvent, and the monomers used. Suitable polymerization initiators for use in the present invention include, but are not limited to, 2,2'-azobisisobutyronitrile, 2,2'-azobis(2-methylbutyronitrile), 2,2'-azobis(2,4-dimethylvaleronitrile),2,2'-azobis(2-amidinopropane) dihydrochloride,2,2'-azobis(N, N'-dimethyleneisobutylamidine),potassium persulfate, ammonium persulfate, and aqueous hydrogen peroxide. The amount of polymerization initiator may range from about 0.01 to 5 weight percent based on the total weight of monomer present.

The polymerization temperature may vary depending on the polymerization solvent, monomers, and initiator used, but in general, ranges from about 20° C. to about 90° C. Polymerization time generally ranges from about 2 to about 8 hours.

In a further embodiment of the present invention, the above-described ion-sensitive polymer formulations are used as binder materials for flushable and/or non-flushable products. In order to be effective as a binder material in flushable products throughout the United States, the ion-sensitive polymer formulations of the present invention remain stable and maintain their integrity while dry or in relatively high concentrations of monovalent and/or divalent ions, but become soluble in water containing up to about 200 ppm divalent ions, especially calcium and/or magnesium ions. Desirably, the ion-sensitive polymer formulations of the present invention are insoluble in a salt solutions containing at least about 0.3 weight percent of one or more inorganic and/or organic salts containing monovalent and/or divalent ions. More desirably, the ion-sensitive polymer formulations of the present invention are insoluble in a salt solution containing from about 0.3 weight percent to about 5.0 weight percent of one or more inorganic and/or organic salts containing monovalent and/or divalent ions. Even more desirably, the ion-sensitive polymer formulations of the present invention are insoluble in salt solutions containing from about 1 weight percent to about 3.0 weight percent of one or more inorganic and/or organic salts containing monovalent and/or divalent ions. Suitable monovalent ions include, but are not limited to, $Na^+$ ions, $K^+$ ions, $Li^+$ ions, $NH_4^+$ ions, low molecular weight quaternary ammonium compounds (e.g., those having fewer than 5 carbons on any side group), and a combination thereof. Suitable divalent ions include, but are not limited to $Mg^{2+}$ and $Ca^{2+}$. Especially desirable inorganic salts include NaCl, $ZnCl_2$, $MgCl_2$ and $CaCl_2$.

Binder Formulations and Fabrics Containing the Same

The polymer formulations of the present invention may be used as binders. The binder formulations of the present invention may be applied to any fibrous substrate. The binders are particularly suitable for use in water-dispersible products. Suitable fibrous substrates include, but are not limited to, nonwoven and woven fabrics. In many embodiments, particularly personal care products, preferred substrates are nonwoven fabrics. As used herein, the term "nonwoven fabric" refers to a fabric that has a structure of individual fibers or filaments randomly arranged in a mat-like fashion (including papers). Nonwoven fabrics can be made from a variety of processes including, but not limited to, air-laid processes, wet-laid processes, hydroentangling processes, staple fiber carding and bonding, and solution spinning.

The binder composition may be applied to the fibrous substrate by any known process of application. Suitable processes for applying the binder material include, but are not limited to, printing, spraying, electrostatic spraying, coating, flooded nips, metered press rolls, impregnating or by any other technique. The amount of binder composition may be metered and distributed uniformly within the fibrous substrate or may be non-uniformly distributed within the fibrous substrate. The binder composition may be distributed throughout the entire fibrous substrate or it may be distributed within a multiplicity of small closely spaced areas. In most embodiments, uniform distribution of binder composition is desired.

For ease of application to the fibrous substrate, the binder may be dissolved in water, or in a non-aqueous solvent such as methanol, ethanol, acetone, or the like, with water being the preferred solvent. The amount of binder dissolved in the solvent may vary depending on the polymer used and the fabric application. Desirably, the binder solution contains up to about 25 percent by weight of binder composition solids. More desirably, the binder solution contains from about 10 to 20 percent by weight of binder composition solids, especially about 12 percent by weight binder composition solids. Plasticizers, perfumes, coloring agents, antifoams, bactericides, preservative, surface active agents, thickening agents, fillers, opacifiers, tackifiers, detackifiers, and similar additives can be incorporated into the solution of binder components, if so desired.

Once the binder composition is applied to the substrate, the substrate is dried by any conventional means. Once dry, the coherent fibrous substrate exhibits improved tensile strength when compared to the tensile strength of the untreated wet-laid or dry-laid substrates, and yet has the ability to rapidly "fall apart", or disintegrate when placed in soft or hard water having a relatively high multivalent ionic concentration and agitated. For example, the dry tensile strength of the fibrous substrate may be increased by at least 25 percent as compared to the dry tensile strength of the untreated substrate not containing the binder. More particularly, the dry tensile strength of the fibrous substrate may be increase by at least 100 percent as compared to the dry tensile strength of the untreated substrate not containing the binder. Even more particularly, the dry tensile strength of the fibrous substrate may be increased by at least 500 percent as compared to the dry tensile strength of the untreated substrate not containing the binder.

A desirable feature of the present invention is that the improvement in tensile strength is effected where the amount of binder composition present, "add-on", in the resultant fibrous substrate represents only a small portion by weight of the entire substrate. The amount of "add-on" can vary for a particular application; however, the optimum amount of "add-on" results in a fibrous substrate which has integrity while in use and also quickly disperses when agitated in water. For example, the binder components typically are from about 5 to about 65 percent, by weight, of the total weight of the substrate. More particularly, the binder components may be from about 10 to about 35 percent, by weight, of the total weight of the substrate. Even more particularly, the binder components may be from about 17 to about 22 percent by weight of the total weight of the substrate.

The nonwoven fabrics of the present invention have good in-use tensile strength, as well as, ion triggerability. Desirably, the nonwoven fabrics of the present invention are abrasion resistant and retain significant tensile strength in aqueous solutions containing greater than about 1 weight percent NaCl, or a mixture of monovalent and/or divalent ions, for those formulations using the polymer formulation of the present invention. Yet, the nonwoven fabrics are dispersible in very soft to moderately hard to hard water. Because of this latter property, nonwoven fabrics of the present invention are well suited for disposable products, such as sanitary napkins, diapers, adult incontinence products, and dry and premoistened wipes (wet wipes), which can be thrown in a flush toilet after use in any part of the world.

The fibers forming the fabrics above can be made from a variety of materials including natural fibers, synthetic fibers, and combinations thereof. The choice of fibers depends upon, for example, the intended end use of the finished fabric and fiber cost. For instance, suitable fibrous substrates may include, but are not limited to, natural fibers such as cotton, linen, jute, hemp, wool, wood pulp, etc. Similarly, regenerated cellulosic fibers, such as viscose rayon and cuprammonium rayon, modified cellulosic fibers, such as cellulose acetate, or synthetic fibers, such as those derived from polypropylenes, polyethylenes, polyolefins, polyesters, polyamides, polyacrylics, etc., alone or in combination with one another, may likewise be used. Blends of one or more of the above fibers may also be used, if so desired. Among wood pulp fibers, any known papermaking fibers may be used, including softwood and hardwood fibers. Fibers, for example, may be chemically pulped or mechanically pulped, bleached or unbleached, virgin or recycled, high yield or low yield, and the like. Mercerized, chemically stiffened or crosslinked fibers may also be used.

Synthetic cellulose fiber types include rayon in all its varieties and other fibers derived from viscose or chemically modified cellulose, including regenerated cellulose and solvent-spun cellulose, such as Lyocell. Chemically treated natural cellulosic fibers can be used, such as mercerized pulps, chemically stiffened or crosslinked fibers, or sulfonated fibers. Recycled fibers, as well as virgin fibers, can be used. Cellulose produced by microbes and other cellulosic derivatives can be used. As used herein, the term "cellulosic" is meant to include any material having cellulose as a major constituent, and, specifically, comprising at least 50 percent by weight cellulose or a cellulose derivative. Thus, the term includes cotton, typical wood pulps, non-woody cellulosic fibers, cellulose acetate, cellulose triacetate, rayon, thermomechanical wood pulp, chemical wood pulp, debonded chemical wood pulp, milkweed, or bacterial cellulose. The fiber length is important in producing the fabrics of the present invention. In some embodiments, such as flushable products, fiber length is of more importance. The minimum length of the fibers depends on the method selected for forming the fibrous substrate. For example, where the fibrous substrate is formed by carding, the length of the fiber should usually be at least about 42 mm in order to insure uniformity. Where the fibrous substrate is formed by air-laid or wet-laid processes, the fiber length may desirably be about 0.2 to 6 mm. Although fibers having a length of greater than 50 mm are within the scope of the present invention, it has been determined that when a substantial quantity of fibers having a length greater than about 15 mm is placed in a flushable fabric, though the fibers will disperse and separate in water, their length tends to form "ropes" of fibers, which are undesirable when flushing in home toilets. Therefore, for these products, it is desired that the fiber length be about 15 mm or less so that the fibers will not have a tendency to "rope" when they are flushed through a toilet. Although fibers of various lengths are applicable in the present invention, desirably fibers are of a length less than about 15 mm so that the fibers disperse easily from one another when in contact with water. The fibers, particularly synthetic fibers, can also be crimped The fabrics of the present invention may be formed from a single layer or multiple layers. In the case of multiple layers, the layers are generally positioned in a juxtaposed or surface-to-surface relationship and all or a portion of the layers may be bound to adjacent layers. Nonwoven webs of the present invention may also be formed from a plurality of separate nonwoven webs wherein the separate nonwoven webs may be formed from single or multiple layers. In those instances where the nonwoven web includes multiple layers, the entire thickness of the nonwoven web may be subjected to a binder application or each individual layer may be separately subjected to a binder application and then combined with other layers in a juxtaposed relationship to form the finished nonwoven web.

In one embodiment, the fabric substrates of the present invention may be incorporated into cleansing and body fluid absorbent products, such as sanitary napkins, diapers, adult incontinence products, surgical dressings, tissues, wet wipes, and the like. These products may include an absorbent core, comprising one or more layers of an absorbent fibrous material. The core may also comprise one or more layers of a fluid-pervious element, such as fibrous tissue, gauze, plastic netting, etc. These are generally useful as wrapping materials to hold the components of the core together. Additionally, the core may comprise a fluid-impervious element or barrier means to preclude the passage of fluid through the core and on the outer surfaces of the product. Desirably, the barrier means also is water-dispersible. A film of a polymer having substantially the same composition as the aforesaid water-dispersible binder is particularly well-suited for this purpose. In accordance with the present invention, the polymer compositions are useful for forming each of the above-mentioned product components including the layers of absorbent core, the fluid-pervious element, the wrapping materials, and the fluid-impervious element or barrier means.

The binder formulations of the present invention are particularly useful for binding fibers of air-laid nonwoven fabrics. These air-laid materials are useful for body-side liners, fluid distribution materials, fluid in-take materials, such as a surge material, absorbent wrap sheet and cover stock for various water-dispersible personal care products. Air-laid materials are particularly useful for use as a pre-moistened wipe (wet wipe). The basis weights for air-laid non-woven fabrics may range from about 20 to about 200 grams per square meter ("gsm") with staple fibers having a denier of about 0.5-10 and a length of about 6-15 millimeters. Surge, or in-take, materials need better resiliency and higher loft so staple fibers having about 6 denier or greater are used to make these products. A desirable final density for the surge, or in-take, materials is between about 0.025 grams per cubic centimeter ("g/cc") to about 0.10 g/cc. Fluid distribution materials may have a higher density, in the desired range of about 0.10 to about 0.20 g/cc using fibers of lower denier, most desirable fibers have a denier of less than about 1.5. Wipes generally can have a fiber density of about 0.025 g/cc to about 0.2 g/cc and a basis weight of about 20 gsm to about 150 gsm; specifically from about 30 to about 90 gsm, and most specifically from about 60 gsm to about 65 gsm.

The nonwoven fabrics of the present invention may also be incorporated into such body fluid absorbing products as sanitary napkins, diapers, surgical dressings, tissues and the like. In one embodiment, the binder is such that it will not dissolve when contacted by body fluids since the concentration of monovalent ions in the body fluids is above the level needed for dissolution; i.e., greater that 0.3% by weight and/or greater than 1% by weight. The nonwoven fabric retains its structure, softness and exhibits a toughness satisfactory for practical use. However, when brought into contact with water having a concentration of multivalent ions, such as $Ca^{2+}$ and $Mg^{2+}$ ions, of up to about 200 ppm, the binder of the present invention disperses. The nonwoven fabric structure is then easily broken and dispersed in the water.

In one embodiment of the present invention, the in-use tensile strength of a nonwoven fabric is enhanced by forming the nonwoven fabric with a binder material comprising an ion-sensitive polymer formulation of the present invention and subsequently applying one or more monovalent and/or multivalent salts to the nonwoven fabric. The salt may be applied to the nonwoven fabric by any method known to those of ordinary skill in the art including, but not limited to, applying a solid powder onto the fabric and spraying a salt solution onto the fabric. The amount of salt may vary depending on a particular application. However, the amount of salt applied to the fabric is typically from about 0.1 weight percent to about 10 weight percent salt solids based on the total weight of the fabric. The salt-containing fabrics of the present invention may be used in a variety of fabric applications including, but not limited to, feminine pads, surgical dressings, and diapers.

Those skilled in the art will readily understand that the binder formulations and fibrous substrates of the present invention may be advantageously employed in the preparation of a wide variety of products, including but not limited to, absorbent personal care products designed to be contacted with body fluids. Such products may only comprise a single layer of the fibrous substrate, or may comprise a combination of elements, as described above. Although the binder formulations and fibrous substrates of the present invention are particularly suited for personal care products, the binder formulations and fibrous substrates may be advantageously employed in a wide variety of consumer products.

Unlike other binder systems known in the art, the ion-sensitive polymer formulations of the present invention can be activated as binders without the need for elevated temperature. While drying or water removal is useful in achieving a good distribution of the binder in a fibrous web, elevated temperature, per se, is not essential because the binder does not require crosslinking or other chemical reactions with high activation energy to serve as a binder. Rather, the interaction with a soluble activating compound, typically a salt, is sufficient to cause the binder to become active (insoluble) or "salted out." Thus, a drying step can be avoided, if desired, or replaced with low-temperature water removal operations such as room-temperature drying or freeze drying. Elevated temperature is generally helpful for drying, but the drying can be done at temperatures below what is normally needed to drive crosslinking reactions. Thus, the peak temperature to which the substrate is exposed or to which the substrate is brought can be below any of the following: 230° C., 180° C., 160° C., 140° C., 120° C., 110° C., 105° C., 100° C., 90° C., 75° C., and 60° C., with an exemplary range for peak web temperature of from about 50° C. to about 110° C., or from about 70° C. to about 140° C. Of course, higher temperatures can be used, but are not necessary in most embodiments.

Wet Wipe Wetting Composition and Wet Wipes Containing the Same

One particularly interesting embodiment of the present invention is the production of pre-moistened wipes, or wet wipes, from the above-described ion-sensitive binder compositions and fibrous materials. For wipes, the fibrous material may be in the form of a woven or nonwoven fabric; however, nonwoven fabrics are more desirable. The nonwoven fabric is, desirably, formed from relatively short fibers, such as wood pulp fibers. The minimum length of the fibers depends on the method selected for forming the nonwoven fabric. Where the nonwoven fabric is formed by a wet or dry method, the fiber length is desirably from about 0.1 millimeters to 15 millimeters. Desirably, the nonwoven fabric of the present invention has a relatively low wet cohesive strength when it is not bonded together by an adhesive or binder material. When such nonwoven fabrics are bonded together by a binder composition, which loses its bonding strength in tap water and in sewer water, the fabric will break up readily by the agitation provided by flushing and moving through the sewer pipes.

The finished wipes may be individually packaged, desirably in a folded condition, in a moisture proof envelope or packaged in containers holding any desired number of sheets in a water-tight package with a wetting composition applied to the wipe. The finished wipes may also be packaged as a roll of separable sheets in a moisture-proof container holding any desired number of sheets on the roll with a wetting composition applied to the wipes. The roll can be coreless and either hollow or solid. Coreless rolls, including rolls with a hollow center or without a solid center, can be produced with known coreless roll winders, including those of SRP Industry, Inc. (San Jose, Calif.); Shimizu Manufacturing (Japan), and the devices disclosed in U.S. Pat. No. 4,667,890, issued May 26, 1987 to Gietman. Solid-wound coreless rolls can offer more product for a given volume and can be adapted for a wide variety of dispensers.

Relative to the weight of the dry fabric, the wipe may desirably contain from about 10 percent to about 400 percent of the wetting composition, more desirably from about 100 percent to about 300 percent of the wetting composition, and even more desirably from about 180 percent to about 240 percent of the wetting composition. The wipe maintains its desired characteristics over the time periods involved in warehousing, transportation, retail display and storage by the consumer. Accordingly, shelf life may range from two months to two years.

Various forms of impermeable envelopes and storage means for containing wet-packaged materials such as wipes and towelettes and the like are well known in the art. Any of these may be employed in packaging the pre-moistened wipes of the present invention.

Desirably, the pre-moistened wipes of the present invention are wetted with an aqueous wetting composition, which has one or more of the following properties:

(1) is compatible with the above-described ion-sensitive binder compositions of the present invention;

(2) enables the pre-moistened wipe to maintain its wet strength during converting, storage and usage (including dispensing), as well as, dispersibility in a toilet bowl;

(3) does not cause skin irritation;

(4) reduces tackiness of the wipe, and provides unique tactile properties, such as skin glide and a "lotion-like feel"; and (5) acts as a vehicle to deliver "moist cleansing" and other skin health benefits.

The wetting composition should not act as a solvent for the binder and generally does not contain solvents other than water, and particularly does not contain organic solvents, though a small quantity (<1%) of a fragrance solubilizer, such as polysorbate 20, may be present, depending on the fragrance and the salt concentration of the wetting composition. Desirably, the wetting composition contains less than about 10 weight percent of organic solvents, such as propylene glycol or other glycols, polyhydroxy alcohols, and the like, based on the total weight of the wetting composition. More desirably, the wetting composition contains less than about 4 weight percent of organic solvents. Even more desirably, the wetting composition contains less than about 1 weight percent of organic solvents. The wetting composition can be substantially free of organic solvents. As used herein the term "substantially free" shall mean containing only trivial or inconsequential amounts.

One aspect of the present invention is a wetting composition, which contains an activating compound that maintains the strength of a water-dispersible binder until the activating compound is diluted with water, whereupon the strength of the water-dispersible binder begins to decay. The activating compound in the wetting composition can be a salt, such as sodium chloride, or any other compound, which provides in-use and storage strength to the water-dispersible binder composition, and can be diluted in water to permit dispersion of the substrate as the binder polymer triggers to a weaker state. Desirably, the wetting composition contains less than about 10 weight percent of an activating compound based on the total weight of the wetting composition. Specifically, the wetting composition may contain from about 1 weight percent to about 5 weight percent of an activating compound. Even more specifically, the wetting composition may contain from about 2 weight percent to about 4 weight percent of an activating compound.

The wetting composition of the present invention may further comprise a variety of additives compatible with the activating compound and the water-dispersible binder, such that the strength and dispersibility functions of the wipe are not jeopardized. Suitable additives in the wetting composition include, but are not limited to, the following additives: skin-care additives; odor control agents; detackifying agents to reduce the tackiness of the binder; particulates; antimicrobial agents; preservatives; wetting agents and cleaning agents such as detergents, surfactants, and some silicones; emollients; surface feel modifiers for improved tactile sensation (e.g., lubricity) on the skin; fragrance; fragrance solubilizers; opacifiers; fluorescent whitening agents; UV absorbers; pharmaceuticals; and pH control agents, such as malic acid or potassium hydroxide.

Skin-Care Additives

As used herein, the term "skin-care additives" represents additives, which provide one or more benefits to the user, such as a reduction in the probability of having diaper rash and/or other skin damage caused by fecal enzymes. These enzymes, particularly trypsin, chymotrypsin and elastase, are proteolytic enzymes produced in the gastrointestinal tract to digest food. In infants, for example, the feces tend to be watery and contain, among other materials, bacteria, and some amounts of undegraded digestive enzymes. These enzymes, if they remain in contact with the skin for any appreciable period of time, have been found to cause an irritation that is uncomfortable in itself and can predispose the skin to infection by microorganisms. As a countermeasure, skin-care additives include, but are not limited to, the enzyme inhibitors and sequestrants set forth hereafter. The wetting composition may contain less than about 5 weight percent of skin-care additives based on the total weight of the wetting composition. More specifically, the wetting composition may contain from about 0.01 weight percent to about 2 weight percent of skin-care additives. Even more specifically, the wetting composition may contain from about 0.01 weight percent to about 0.05 weight percent of skin-care additives.

A variety of skin-care additives may be added to the wetting composition and the pre-moistened wipes of the present invention or included therein. In one embodiment of the present invention, skin-care additives in the form of particles are added to serve as fecal enzyme inhibitors, offering potential benefits in the reduction of diaper rash and skin damage caused by fecal enzymes. U.S. Pat. No. 6,051,749, issued Apr. 18, 2000 to Schulz et al., the entirety of which is herein incorporated by reference, discloses organophilic clays in a woven or nonwoven web, said to be useful for inhibiting fecal enzymes. Such materials may be used in the present invention, including reaction products of a long chain organic quaternary ammonium compound with one or more of the following clays: montmorillonite, bentonite, beidellite, hectorite, saponite, and stevensite.

Other known enzyme inhibitors and sequestrants may be used as skin-care additives in the wetting composition of the present invention, including those that inhibit trypsin and other digestive or fecal enzymes, and inhibitors for urease. For example, enzyme inhibitors and anti-microbial agents may be used to prevent the formation of odors in body fluids. For example, urease inhibitors, which are also said to play a role in odor absorption, are disclosed by T. Trinh in World Patent Application No. 98/26808, "Absorbent Articles with Odor Control System," published Jun. 25, 1998, the entirety of which is herein incorporated by reference. Such inhibitors may be incorporated into the wetting composition and the pre-moistened wipes of the present invention and include transition metal ions and their soluble salts, such as silver, copper, zinc, ferric, and aluminum salts. The anion may also provide urease inhibition, such as borate, phytate, etc. Compounds of potential value include, but are not limited to, silver chlorate, silver nitrate, mercury acetate, mercury chloride, mercury nitrate, copper metaborate, copper bromate, copper bromide, copper chloride, copper dichromate, copper nitrate, copper salicylate, copper sulfate, zinc acetate, zinc borate, zinc phytate, zinc bromate, zinc bromide, zinc chlorate, zinc chloride, zinc sulfate, cadmium acetate, cadmium borate, cadmium bromide, cadmium chlorate, cadmium chloride, cadmium formate, cadmium iodate, cadmium iodide, cadmium permanganate, cadmium nitrate, cadmium sulfate, and gold chloride.

Other salts that have been disclosed as having urease inhibition properties include ferric and aluminum salts, especially the nitrates, and bismuth salts. Other urease inhibitors are disclosed by Trinh, including hydroxamic acid and its derivatives; thiourea; hydroxylamine; salts of phytic acid; extracts of plants of various species, including various tannins, e.g. carob tannin, and their derivatives such as chlorogenic acid derivatives; naturally occurring acids such as ascorbic acid, citric acid, and their salts; phenyl phosphoro diamidate/diamino phosphoric acid phenyl ester; metal aryl phosphoramidate complexes, including substituted phosphorodiamidate compounds; phosphoramidates without substitution on the nitrogen; boric acid and/or its salts, including especially, borax, and/or organic boron acid compounds; the compounds disclosed in European Patent Application 408, 199; sodium, copper, manganese, and/or zinc dithiocarbamate; quinones; phenols; thiurams; substituted rhodanine acetic acids; alkylated benzoquinones; formamidine disulphide; 1:3-diketones maleic anhydride; succinamide; phthalic anhydride; pehenic acid; /N,N-dihalo-2-imidazolidinones; N-halo2-oxazolidinones; thio- and/or acyl-phosphoryltnamide and/or substituted derivatives thereof-, thiopyridine-N-oxides, thiopyridines, and thiopyrimidines; oxidized sulfur derivatives of diaminophosphinyl compounds; cyclotriphosphazatriene derivatives; ortho-diaminophosphinyl derivatives of oximes; bromo-nitro compounds; S-aryl and/or alkyl diamidophosphorothiolates; diaminophosphinyl derivatives; mono- and/or polyphosphorodiamide; 5-substituted-benzoxathiol-2-ones; N(diaminophosphinyl)arylcarboxamides; alkoxy-1,2-benzothaizin compounds; etc.

Many other skin-care additives may be incorporated into the wetting composition and pre-moistened wipes of the present invention, including, but not limited to, sun blocking agents and UV absorbers, acne treatments, pharmaceuticals, baking soda (including encapsulated forms thereof), vitamins and their derivatives such as Vitamins A or E, botanicals such as witch hazel extract and aloe vera, allantoin, emollients, disinfectants, hydroxy acids for wrinkle control or anti-aging effects, sunscreens, tanning promoters, skin lighteners, deodorants and antiperspirants, ceramides for skin benefits and other uses, astringents, moisturizers, nail polish removers, insect repellants, antioxidants, antiseptics, anti-inflammatory agents and the like, provided that the additives are compatible with an ion-sensitive binder composition associated therewith, and especially the ion-sensitive binder compositions of the present invention (i.e., they do not cause a substantial loss of strength in the wet state of the pre-moistened wipes, prior to dilution in water, while permitting dispersibility in water).

Useful materials for skin care and other benefits are listed in McCutcheon's 1999, Vol. 2: Functional Materials, MC Publishing Company, Glen Rock, N.J. Many useful botanicals for skin care are provided by Active Organics, Lewisville, Tex.

Odor Control Additives

Suitable odor control additives for use in the wetting composition and pre-moistened wipes of the present invention include, but are not limited to, zinc salts; talc powder; encapsulated perfumes (including microcapsules, macrocapsules, and perfume encapsulated in liposomes, vessicles, or microemulsions); chelants, such as ethylenediamine tetra-acetic acid; zeolites; activated silica, activated carbon granules or fibers; activated silica particulates; polycarboxylic acids, such as citric acid; cyclodextrins and cyclodextrin derivatives; chitosan or chitin and derivatives thereof; oxidizing agents; antimicrobial agents, including silver-loaded zeolites (e.g., those of BF Technologies, located in Beverly, Mass., sold under the trademark HEALTHSHIELD™); triclosan; kieselguhr; and mixtures thereof. In addition to controlling odor from the body or body wastes, odor control strategies can also be employed to mask or control any odor of the treated substrate. Desirably, the wetting composition contains less than about 5 weight percent of odor control additives based on the total weight of the wetting composition. More desirably, the wetting composition contains from about 0.01 weight percent to about 2 weight percent of odor control additives. Even more desirably, the wetting composition contains from about 0.03 weight percent to about 1 weight percent of odor control additives.

In one embodiment of the present invention, the wetting composition and/or pre-moistened wipes comprise derivatized cyclodextrins, such as hydroxypropyl beta-cyclodextrin in solution, which remain on the skin after wiping and provide an odor-absorbing layer. In other embodiments, the odor source is removed or neutralized by application of an odor-control additive, exemplified by the action of a chelant that binds metal groups necessary for the function of many proteases and other enzymes that commonly produce an odor. Chelating the metal group interferes with the enzyme's action and decreases the risk of malodor in the product.

Principles for the application of chitosan or chitin derivatives to nonwoven webs and cellulosic fibers are described by S. Lee et al. in "Antimicrobial and Blood Repellent Finishes for Cotton and Nonwoven Fabrics Based on Chitosan and Fluoropolymers," Textile Research Journal, 69(2); 104-112, February 1999.

Detackifying Agents

While elevated salt concentrations may reduce the tack of the ion-sensitive binder, other means of tack reduction are often desirable. Thus, detackifying agents may be used in the wetting composition to reduce the tackiness, if any, of the ion-sensitive binder. Suitable detackifiers include any substance known in the art to reduce tack between two adjacent fibrous sheets treated with an adhesive-like polymer or any substance capable of reducing the tacky feel of an adhesive-like polymer on the skin. Detackifiers may be applied as solid particles in dry form, as a suspension or as a slurry of particles. Deposition may be by spray, coating, electrostatic deposition, impingement, filtration (i.e., a pressure differential drives a particle-laden gas phase through the substrate, depositing particles by a filtration mechanism), and the like, and may be applied uniformly on one or more surfaces of the substrate or may be applied in a pattern (e.g., repeating or random patterns) over a portion of the surface or surfaces of the substrate. The detackifier may be present throughout the thickness of the substrate, but may be concentrated at one or both surfaces, and may be substantially only present on one or both surfaces of the substrate.

Specific detackifiers include, but are not limited to, powders, such as talc powder, calcium carbonate, mica; starches, such as corn starch; lycopodium powder; mineral fillers, such as titanium dioxide; silica powder; alumina; metal oxides in general; baking powder; kieselguhr; and the like. Polymers and other additives having low surface energy may also be used, including a wide variety of fluorinated polymers, silicone additives, polyolefins and thermoplastics, waxes, debonding agents known in the paper industry including compounds having alkyl side chains such as those having 16 or more carbons, and the like. Compounds used as release agents for molds and candle making may also be considered, as well as, dry lubricants and fluorinated release agents.

In one embodiment, the detackifier comprises polytetrafluoroethylene (PTFE), such as PTFE telomer (KRYTOXO DF) compound, used in the PTFE release agent dry lubricant MS-122DF, marketed by Miller-Stephenson (Danbury, Conn.) as a spray product. For example, PTFE particles may be applied by spray to one side of the substrate prior to winding of the pre-moistened wipes. In one embodiment, a detackifying agent is applied to only one surface of the substrate prior to winding into a roll.

The wetting composition desirably contains less than about 25 weight percent of detackifying agents based on the total weight of the wetting composition. More desirably, the wetting composition contains from about 0.01 weight percent to about 10 weight percent of detackifying agents, more specifically about 5% or less. Even more specifically, the wetting composition contains from about 0.05 weight percent to about 2 weight percent of detackifying agents.

In addition to acting as a detackifying agent, starch compounds may also improve the strength properties of the pre-moistened wipes. For example, it has been found that ungelled starch particles, such as hydrophilic tapioca starch, when present at a level of about 1% or higher by weight relative to the weight of the wetting composition, can permit the pre-moistened wipe to maintain the same strength at a lower salt concentration than is possible without the presence of starch. Thus, for example, a given strength can be achieved with 2% salt in the wetting composition in the presence of salt compared to a level of 4% salt being needed without starch. Starch may be applied by adding the starch to a suspension of laponite to improve the dispersion of the starch within the wetting composition.

Microparticulates

The wetting composition of the present invention may be further modified by the addition of solid particulates or microparticulates. Suitable particulates include, but are not limited to, mica, silica, alumina, calcium carbonate, kaolin, talc, and zeolites. The particulates may be treated with stearic acid or other additives to enhance the attraction or bridging of the particulates to the binder system, if desired. Also, two-component microparticulate systems, commonly used as retention aids in the papermaking industry, may also be used. Such two-component microparticulate systems generally comprise a colloidal particle phase, such as silica particles, and a water-soluble cationic polymer for bridging the particles to the fibers of the web to be formed. The presence of particulates in the wetting composition can serve one or more useful functions, such as (1) increasing the opacity of the pre-moistened wipes; (2) modifying the rheology or reducing the tackiness of the pre-moistened wipe; (3) improving the tactile properties of the wipe; or (4) delivering desired agents to the skin via a particulate carrier, such as a porous carrier or a microcapsule. Desirably, the wetting composition contains less than about 25 weight percent of particulate based on the total weight of the wetting composition. More specifically, the wetting composition may contain from about 0.05 weight percent to about 10 weight percent of microparticulate. Even more specifically, the wetting composition may contain from about 0.1 weight percent to about 5 weight percent of microparticulate.

Microcapsules and Other Delivery Vehicles

Microcapsules and other delivery vehicles may also be used in the wetting composition of the present invention to provide skin-care agents; medications; comfort promoting agents, such as eucalyptus; perfumes; skin care agents; odor control additives; vitamins; powders; and other additives to the skin of the user. Specifically, the wetting composition may contain up to about 25 weight percent of microcapsules or other delivery vehicles based on the total weight of the wetting composition. More specifically, the wetting composition may contain from about 0.05 weight percent to about 10 weight percent of microcapsules or other delivery vehicles. Even more specifically, the wetting composition may contain from about 0.2 weight percent to about 5.0 weight percent of microcapsules or other delivery vehicles.

Microcapsules and other delivery vehicles are well known in the art. For example, POLY-PORE® E200 (Chemdal Corp., Arlington Heights, Ill.), is a delivery agent comprising soft, hollow spheres that can contain an additive at over 10 times the weight of the delivery vehicle. Known additives reported to have been used with POLY-PORE® E200 include, but are not limited to, benzoyl peroxide, salicylic acid, retinol, retinyl palmitate, octyl methoxycinnamate, tocopherol, silicone compounds (DC 435), and mineral oil. Another useful delivery vehicle is a sponge-like material marketed as POLY-PORE® L200, which is reported to have been used with silicone (DC 435) and mineral oil. Other known delivery systems include cyclodextrins and their derivatives, liposomes, polymeric sponges, and spray-dried starch.

Additives present in microcapsules are isolated from the environment and the other agents in the wetting composition until the wipe is applied to the skin, whereupon the microcapsules break and deliver their load to the skin or other surfaces.

Preservatives and Anti-Microbial Agents

The wetting composition of the present invention may also contain preservatives and/or anti-microbial agents. Several preservatives and/or anti-microbial agents, such as Mackstat H 66 (available from McIntyre Group, Chicago, Ill.), have been found to give excellent results in preventing bacteria and mold growth. Other suitable preservatives and anti-microbial agents include, but are not limited to DMDM hydantoin (e.g., Glydant Plus™, Lonza, Inc., Fair Lawn, N.J.), iodopropynyl butylcarbamate, Kathon (Rohm and Hass, Philadelphia, Pa.), methylparaben, propylparaben, 2-bromo-2-nitropropane-1, 3-diol, benzoic acid, and the like. Desirably, the wetting composition contains less than about 2 weight percent on an active basis of preservatives and/or anti-microbial agents based on the total weight of the wetting composition. More desirably, the wetting composition contains from about 0.01 weight percent to about 1 weight percent of preservatives and/or anti-microbial agents. Even more desirably, the wetting composition contains from about 0.01 weight percent to about 0.5 weight percent of preservatives and/or anti-microbial agents.

Wetting Agents and Cleaning Agents

A variety of wetting agents and/or cleaning agents may be used in the wetting composition of the present invention. Suitable wetting agents and/or cleaning agents include, but are not limited to, detergents and nonionic, amphoteric, and anionic surfactants, especially amino acid-based surfactants. Amino acid-based surfactant systems, such as those derived from amino acids L-glutamic acid and other natural fatty acids, offer pH compatibility to human skin and good cleansing power, while being relatively safe and providing improved tactile and moisturization properties compared to other anionic surfactants. One function of the surfactant is to improve wetting of the dry substrate with the wetting composition. Another function of the surfactant can be to disperse bathroom soils when the pre-moistened wipe contacts a soiled area and to enhance their absorption into the substrate. The surfactant can further assist in make-up removal, general personal cleansing, hard surface cleansing, odor control, and the like.

One commercial example of an amino-acid based surfactant is acylglutamate, marketed under the Amisoft name by Ajinomoto Corp., Tokyo, Japan. Desirably, the wetting composition contains less than about 3 weight percent of wetting agents and/or cleaning agents based on the total weight of the wetting composition. More desirably, the wetting composition contains from about 0.01 weight percent to about 2 weight percent of wetting agents and/or cleaning agents. Even more desirably, the wetting composition contains from about 0.1 weight percent to about 0.5 weight percent of wetting agents and/or cleaning agents.

Although amino-acid based surfactant are particularly useful in the wetting compositions of the present invention, a wide variety of surfactants may be used in the present invention. Suitable non-ionic surfactants include, but are not limited to, the condensation products of ethylene oxide with a hydrophobic (oleophilic) polyoxyalkylene base formed by the condensation of propylene oxide with propylene glycol. The hydrophobic portion of these compounds desirably has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include commercially-available Pluronic surfactants (BASF Wyandotte Corp.), especially those in which the polyoxypropylene ether has a molecular weight of about 1500-3000 and the polyoxyethylene content is about 35-55% of the molecule by weight, i.e. Pluronic L-62.

Other useful nonionic surfactants include, but are not limited to, the condensation products of $C_8$-$C_{22}$ alkyl alcohols with 2-50 moles of ethylene oxide per mole of alcohol. Examples of compounds of this type include the condensation products of $C_{11}$-$C_{15}$ secondary alkyl alcohols with 3-50 moles of ethylene oxide per mole of alcohol, which are commercially-available as the Poly-Tergent SLF series from Olin Chemicals or the TERGITOL® series from Union Carbide, i.e. TERGITOL® 25-L-7, which is formed by condensing about 7 moles of ethylene oxide with a $C_{12}$-$C_{15}$ alkanol.

Other nonionic surfactants, which may be employed in the wetting composition of the present invention, include the ethylene oxide esters of $C_6$-$C_{12}$ alkyl phenols such as (nonylphenoxy)polyoxyethylene ether. Particularly useful are the esters prepared by condensing about 8-12 moles of ethylene oxide with nonylphenol, i.e. the IGEPAL® CO series (GAF Corp.).

Further non-ionic surface active agents include, but are not limited to, alkyl polyglycosides (APG), derived as a condensation product of dextrose (D-glucose) and a straight or branched chain alcohol. The glycoside portion of the surfactant provides a hydrophile having high hydroxyl density, which enhances water solubility. Additionally, the inherent stability of the acetal linkage of the glycoside provides chemical stability in alkaline systems. Furthermore, unlike some non-ionic surface active agents, alkyl polyglycosides have no cloud point, allowing one to formulate without a hydrotrope, and these are very mild, as well as readily biodegradable non-ionic surfactants. This class of surfactants is available from Horizon Chemical under the trade names of APG-300, APG-350, APG-500, and APG-500.

Silicones are another class of wetting agents available in pure form, or as microemulsions, macroemulsions, and the like. One exemplary non-ionic surfactant group is the silicone-glycol copolymers. These surfactants are prepared by adding poly(lower)alkylenoxy chains to the free hydroxyl groups of dimethylpolysiloxanols and are available from the Dow Corning Corp as Dow Corning 190 and 193 surfactants (CTFA name: dimethicone copolyol). These surfactants function, with or without any volatile silicones used as solvents, to control foaming produced by the other surfactants, and also impart a shine to metallic, ceramic, and glass surfaces.

Anionic surfactants may also be used in the wetting compositions of the present invention. Anionic surfactants are useful due to their high detergency include anionic detergent salts having alkyl substituents of 8 to 22 carbon atoms such as the water-soluble higher fatty acid alkali metal soaps, e.g., sodium myristate and sodium palmitate. A preferred class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group, with examples available as the Bio-Soft series, i.e. Bio-Soft D-40 (Stepan Chemical Co.).

Other useful classes of anionic surfactants include, but are not limited to, the alkali metal salts of alkyl naphthalene sulfonic acids (methyl naphthalene sodium sulfonate, Petro AA, Petrochemical Corporation); sulfated higher fatty acid monoglycerides such as the sodium salt of the sulfated monoglyceride of cocoa oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium $C_{14}$-$C_{16}$-alphaolefin sulfonates such as the Bio-Terge series (Stepan Chemical Co.); alkali metal salts of sulfated ethyleneoxy fatty alcohols (the sodium or ammonium sulfates of the condensation products of about 3 moles of ethylene oxide with a $C_{12}$-$C_{15}$ n-alkanol, i.e., the Neodol ethoxysulfates, Shell Chemical Co.); alkali metal salts of higher fatty esters of low molecular weight alkylol sulfonic acids, e.g. fatty acid esters of the sodium salt of isothionic acid, the fatty ethanolamide sulfates; the fatty acid amides of amino alkyl sulfonic acids, e.g. lauric acid amide of taurine; as well as numerous other anionic organic surface active agents such as sodium xylene sulfonate, sodium naphthalene sulfonate, sodium toulene sulfonate and mixtures thereof.

A further useful class of anionic surfactants includes the 8-(4-n-alkyl-2-cyclohexenyl)-octanoic acids, wherein the cyclohexenyl ring is substituted with an additional carboxylic acid group. These compounds or their potassium salts, are commercially-available from Westvaco Corporation as Diacid 1550 or H-240. In general, these anionic surface active agents can be employed in the form of their alkali metal salts, ammonium or alkaline earth metal salts.

Macroemulsions and Microemulsion of Silicone Particles

The wetting composition may further comprise an aqueous microemulsion of silicone particles. For example, U.S. Pat. No. 6,037,407, "Process for the Preparation of Aqueous Emulsions of Silicone Oils and/or Gums and/or Resins" issued Mar. 14, 2000, discloses organopolysiloxanes in an aqueous microemulsion. Desirably, the wetting composition contains less than about 5 weight percent of a microemulsion of silicone particles based on the total weight of the wetting composition. More desirably, the wetting composition contains from about 0.02 weight percent to about 3 weight percent of a microemulsion of silicone particles. Even more desirably, the wetting composition contains from about 0.02 weight percent to about 0.5 weight percent of a microemulsion of silicone particles.

Silicone emulsions in general may be applied to the pre-moistened wipe by any known coating method. For example, the pre-moistened wipe may be moistened with an aqueous composition comprising a water-dispersible or water-miscible, silicone-based component that is compatible with the activating compound in the wetting composition. Further, the wipe can comprise a nonwoven web of fibers having a water-dispersible binder, wherein the web is moistened with a lotion comprising a silicone-based sulfosuccinate. The silicone-based sulfosuccinate provides gentle and effective cleansing without a high level of surfactant. Additionally, the silicone-based sulfosuccinate provides a solubilization function, which prevents precipitation of oil-soluble components, such as fragrance components, vitamin extracts, plant extracts, and essential oils.

In one embodiment of the present invention, the wetting composition comprises a silicone copolyol sulfosuccinate, such as disodium dimethicone copolyol sulfosuccinate and diammonium dimethicone copolyolsulfosuccinate. Desirably, the wetting composition comprises less than about 2 percent by weight of the silicone-based sulfosuccinate, and more desirably from about 0.05 percent to about 0.30 percent by weight of the silicone-based sulfosuccinate.

In another example of a product comprising a silicone emulsions, Dow Corning 9506 powder may also be present in the wetting composition. Dow Corning 9506 powder is believed to comprise a dimethicone/vinyldimethicone crosspolymer and is a spherical powder, which is said to be useful in controlling skin oils (see "New Chemical Perspectives," Soap and Cosmetics, Vol. 76, No. 3, March 2000, p. 12). Thus, a water-dispersible wipe, which delivers a powder effective in controlling skin oil, is also within the scope of the present invention. Principles for preparing silicone emulsions are disclosed in WO 97/10100, published Mar. 20, 1997.

Emollients

The wetting composition of the present invention may also contain one or more emollients. Suitable emollients include, but are not limited to, PEG 75 lanolin, methyl gluceth 20 benzoate, $C_{12}$-$C_{15}$ alkyl benzoate, ethoxylated cetyl stearyl alcohol, products marketed as Lambent wax WS-L, Lambent WD-F, Cetiol HE (Henkel Corp.), Glucam P20 (Amerchol), Polyox WSR N-10 (Union Carbide), Polyox WSR N-3000 (Union Carbide), Luviquat (BASF), Finsolv SLB 101 (Finetex Corp.), mink oil, allantoin, stearyl alcohol, Estol 1517 (Unichema), and Finsolv SLB 201 (Finetex Corp.).

An emollient can also be applied to a surface of the article prior to or after wetting with the wetting composition. Such an emollient may be insoluble in the wetting composition and can be immobile except when exposed to a force. For example, a petrolatum-based emollient can be applied to one surface in a pattern, after which the other surface is wetted to saturate the wipe. Such a product could provide a cleaning surface and an opposing skin treatment surface.

The emollient composition in such products and other products of the present invention can comprise a plastic or fluid emollient such as one or more liquid hydrocarbons (e.g., petrolatum), mineral oil and the like, vegetable and animal fats (e.g., lanolin, phospholipids and their derivatives) and/or a silicone materials such as one or more alkyl substituted polysiloxane polymers, including the polysiloxane emollients disclosed in U.S. Pat. No. 5,891,126, issued Apr. 6, 1999 to Osbom, III et al. Optionally, a hydrophilic surfactant may be combined with a plastic emollient to improve wettability of the coated surface. In some embodiments of the present invention, it is contemplated that liquid hydrocarbon emollients and/or alkyl substituted polysiloxane polymers may be blended or combined with one or more fatty acid ester emollients derived from fatty acids or fatty alcohols.

In an embodiment of the present invention, the emollient material is in the form of an emollient blend. Desirably, the emollient blend comprises a combination of one or more liquid hydrocarbons (e.g., petrolatum), mineral oil and the like, vegetable and animal fats (e.g., lanolin, phospholipids and their derivatives), with a silicone material such as one or more alkyl substituted polysiloxane polymers. More desirably, the emollient blend comprises a combination of liquid hydrocarbons (e.g., petrolatum) with dimethicone or with dimethicone and other alkyl substituted polysiloxane polymers. In some embodiments of the present invention, it is contemplated that blends of liquid hydrocarbon emollients and/or alkyl substituted polysiloxane polymers may be blended with one or more fatty acid ester emollients derived from fatty acids or fatty alcohols. PEG-7 glyceryl cocoate, available as Standamul HE (Henkel Corp., Hoboken, N.J), can also be considered.

Water-soluble, self-emulsifying emollient oils, which are useful in the present wetting compositions, include the polyoxyalkoxylated lanolins and the polyoxyalkoxylated fatty alcohols, as disclosed in U.S. Pat. No. 4,690,821, issued Sep. 1, 1987 to Smith et al. The polyoxyalkoxy chains desirably will comprise mixed propylenoxy and ethyleneoxy units. The lanolin derivatives will typically comprise about 20-70 such lower-alkoxy units while the $C_{12}$-$C_{20}$-fatty alcohols will be derivatized with about 8-15 lower-alkyl units. One such useful lanolin derivative is Lanexol AWS (PPG-12-PEG-50, Croda, Inc., New York, N.Y.). A useful poly(15-20)$C_2$-$C_3$-alkoxylate is PPG-5-Ceteth-20, known as Procetyl AWS (Croda, Inc.).

According to one embodiment of the present invention, the emollient material reduces undesirable tactile attributes, if any, of the wetting composition. For example, emollient materials, including dimethicone, can reduce the level of tackiness that may be caused by the ion-sensitive binder or other components in the wetting composition, thus serving as a detackifier.

Desirably, the wetting composition contains less than about 25 weight percent of emollients based on the total weight of the wetting composition. More specifically, the wetting composition may comprise less than about 5 weight percent emollient, and most specifically less than about 2% emollient. More desirably, the wetting composition may contain from about 0.01 weight percent to about 8 weight percent of emollients. Even more desirably, the wetting composition may contain from about 0.2 weight percent to about 2 weight percent of emollients.

In one embodiment, the wetting composition and/or pre-moistened wipes of the present invention comprise an oil-in-water emulsion comprising an oil phase containing at least one emollient oil and at least one emollient wax stabilizer dispersed in an aqueous phase comprising at least one polyhydric alcohol emollient and at least one organic water-soluble detergent, as disclosed in U.S. Pat. No. 4,559,157, issued Dec. 17, 1985 to Smith et al., the entirety of which is herein incorporated by reference.

Surface Feel Modifiers

Surface feel modifiers are used to improve the tactile sensation (e.g., lubricity) of the skin during use of the product. Suitable surface feel modifiers include, but are not limited to, commercial debonders; and softeners, such as the softeners used in the art of tissue making including quaternary ammonium compounds with fatty acid side groups, silicones, waxes, and the like. Exemplary quaternary ammonium compounds with utility as softeners are disclosed in U.S. Pat. No. 3,554,862, issued to Hervey et al. on Jan. 12, 1971; U.S. Pat. No. 4,144,122, issued to Emanuelsson et al., Mar. 13, 1979, U.S. Pat. No. 5,573,637, issued to Ampulski et al. Nov. 12, 1996; and U.S. Pat. No. 4,476,323, issued to Hellsten et al., Oct. 9, 1984, the entirety of all of which is herein incorporated by reference. Desirably, the wetting composition contains less than about 2 weight percent of surface feel modifiers based on the total weight of the wetting composition. More desirably, the wetting composition contains from about 0.01 weight percent to about 1 weight percent of surface feel modifiers. Even more desirably, the wetting composition contains from about 0.01 weight percent to about 0.05 weight percent of surface feel modifiers.

Fragrances

A variety of fragrances may be used in the wetting composition of the present invention. Desirably, the wetting composition contains less than about 2 weight percent of fragrances based on the total weight of the wetting composition. More desirably, the wetting composition contains from about 0.01 weight percent to about 1 weight percent of fragrances. Even more desirably, the wetting composition contains from about 0.01 weight percent to about 0.05 weight percent of fragrances.

Fragrance Solubilizers

Further, a variety of fragrance solubilizers may be used in the wetting composition of the present invention. Suitable fragrance solubilizers include, but are not limited to, polysorbate 20, propylene glycol, ethanol, isopropanol, diethylene glycol monoethyl ether, dipropylene glycol, diethyl phthalate, triethyl citrate, Ameroxol OE-2 (Amerchol Corp.), Brij 78 and Brij 98 (ICI Surfactants), Arlasolve 200 (ICI Surfactants), Calfax 16L-35 (Pilot Chemical Co.), Capmul POE-S (Abitec Corp.), Finsolv SUBSTANTIAL (Finetex), and the like. Desirably, the wetting composition contains less than about 2 weight percent of fragrance solubilizers based on the total weight of the wetting composition. More desirably, the wetting composition contains from about 0.01 weight percent to about 1 weight percent of fragrance solubilizers. Even more desirably, the wetting composition contains from about 0.01 weight percent to about 0.05 weight percent of fragrance solubilizers.

Opacifiers

Suitable opacifiers include, but are not limited to, titanium dioxide or other minerals or pigments, and synthetic opacifiers such as REACTOPAQUE® particles (available from Sequa Chemicals, Inc., Chester, S.C.). Desirably, the wetting composition contains less than about 2 weight percent of opacifiers based on the total weight of the wetting composition. More desirably, the wetting composition contains from about 0.01 weight percent to about 1 weight percent of opacifiers. Even more desirably, the wetting composition contains from about 0.01 weight percent to about 0.05 weight percent of opacifiers.

pH Control Agents

Suitable pH control agents for use in the wetting composition of the present invention include, but are not limited to, malic acid, citric acid, hydrochloric acid, acetic acid, sodium hydroxide, potassium hydroxide, and the like. An appropriate pH range minimizes the amount of skin irritation resulting from the wetting composition on the skin. Desirably, the pH range of the wetting composition is from about 3.5 to about 6.5. More desirably, the pH range of the wetting composition is from about 4 to about 6. Desirably, the wetting composition In another embodiment of the present invention, the wetting composition comprises the following components, given in weight percent of the wetting composition, as shown in Table 2 below:

TABLE 2

Wetting Composition Components

| Class of Wetting Composition Component: | Specific Wetting Composition Component: | Component Name: | Weight Percent: |
|---|---|---|---|
| Vehicle | Deionized Water | | about 86 to about 98 |
| Activating compound | Sodium Chloride (Millport Ent., Milwaukee, WI) | | about 1 to about 6 |
| Preservative | Glycerin, IPBC and DMDM Hydantoin | Mackstat H-66 (McIntyre Group, Chicago, IL) | Up to about 2 |
| Surfactant | Acyl Glutamate | CS22 (Ajinomoto, Tokyo, Japan) | Up to about 2 |
| Silicone Emulsion (Detackifier/Skin Feel agent) | Dimethiconol and TEA Dodecylbenezene Sulfonate | DC1785 (Dow Corning, Midland, MI) | Up to about 1 |
| Emollient | PEG-75 Lanolin | Solulan L-575 (Amerchol, Middlesex, NJ) | Up to about 1 |
| Fragrance | Fragrance | Dragoco 0/708768 (Dragoco, Roseville, MN) | Up to about 0.3 |
| Fragrance solubilizer | Polysorbate 20 | Glennsurf L20 (Glenn Corp., St. Paul, MN) | Up to about 0.5 |
| pH adjuster | Malic Acid to pH 5 (Haarman & Reimer, Tetrboro, NJ) | | Up to about 0.2 | contains less than about 2 weight percent of a pH adjuster based on the total weight of the wetting composition. More desirably, the wetting composition contains from about 0.01 weight percent to about 1 weight percent of a pH adjuster. Even more desirably, the wetting composition contains from about 0.01 weight percent to about 0.05 weight percent of a pH adjuster.

Although a variety of wetting compositions, formed from one or more of the above-described components, may be used with the wet wipes of the present invention, in one embodiment, the wetting composition contains the following components, given in weight percent of the wetting composition, as shown in Table 1 below:

TABLE 1

Wetting Composition Components

| Wetting Composition Component: | Weight Percent: |
|---|---|
| Deionized Water | about 86 to about 98 |
| Activating compound | about 1 to about 6 |
| Preservative | Up to about 2 |
| Surfactant | Up to about 2 |
| Silicone Emulsion | Up to about 1 |
| Emollient | Up to about 1 |
| Fragrance | Up to about 0.3 |
| Fragrance solubilizer | Up to about 0.5 |
| pH adjuster | Up to about 0.2 |

In another embodiment of the present invention, the wetting composition comprises the following components, given in weight percent of the wetting composition, as shown in Table 3 below:

TABLE 3

An Exemplary Wetting Composition

| Class of Wetting composition Component: | Specific Wetting composition Component: | Component Name: | Weight Percent: |
|---|---|---|---|
| Vehicle | Deionized Water | | about 93 |
| Activating compound | Sodium Chloride | | about 4 |
| Preservative | Glycerin, IPBC and DMDM Hydantoin | Mackstat H-66 | about 1 |
| Surfactant | Acyl Glutamate | CS22/ECS 22P | about 1 |
| Silicone Emulsion | Dimethiconol and TEA Dodecylbenezene Sulfonate | DC 1784/ DC1785 | about 0.5 |
| Emollient | PEG-75 Lanolin | Solulan L-575 | about 0.25 |
| Fragrance | Fragrance | Dragoco Fragrance 0/708768 | about 0.05 |
| Fragrance solubilizer | Polysorbate 20 | Glennsurf L20 | about 0.25 |
| pH adjuster | Malic Acid to pH 5 | | about 0.07 |

It should be noted that the above-described wetting compositions of the present invention may be used with the above-described ion-sensitive binder compositions of the present invention. Further, the above-described wetting compositions of the present invention may be used with any other binder composition, including conventional binder compositions, or with any known fibrous or absorbent substrate, whether dispersible or not.

Strength Properties

Unless otherwise specified, tensile testing is performed according to the following protocol. Testing of dry product should be conducted under Tappi conditions (50% relative humidity, 73° F.) with a procedure similar to ASTM-1117-80, section 7. Tensile tests are performed with a constant crosshead speed tensile tester such as the Thwing Albert 1256-100 tensile tester with an RSA-2 10-kg load cell. Specimens are cut to 3-inch widths and 6 inch lengths, and mounted between jaws with a 4-inch gauge length. The crosshead speed is 12 inches per minute. Peak load (for tensile strength) and elongation at peak load (for stretch) are measured. For cross direction (CD) tensile tests, the sample is cut in the cross direction. For machine direction (MD) tensile tests, the sample is cut in the cross direction.

Tensile tests in the dry state are reported for webs taken prior to application of the wetting composition. The machine direction dry tensile strength is abbreviated as "MDDT," and the cross direction dry tensile strength as "CDDT." The results can be reported as kg/3-in or converted to units of g/in or g/2.54 cm.

Based on the dry weight of the specimen cut to the appropriate size, an excess amount of wetting solution (4% saline solution with no other additives, unless otherwise specified) is applied to reach a solution add-on of 250-400%. The wetted specimens are then immediately passed through an Atlas Lab Wringer (Atlas Electric Devices Company, Chicago, Ill. No. 10404 LW-1, no load) to uniformly distribute the solution in the sample and gently remove the excess solution to achieve a final solution add-on of 200%. Several iterations or passes may be needed to reach the add-on target depending on the sample. The completed, pre-moistened samples are then bagged in plastic to prevent dry-out before testing.

Cross direction wet tensile tests (CDWT) or machine direction wet tensile strength (MDWT) are performed as described above using the pre-moistened sample as is, after the sample has equilibrated by sitting overnight in a sealed plastic bag.

For tests related to strength loss in a premoistened web occurring after exposure to a new solution, a container having dimensions of 200 mm by 120 mm and deep enough to hold 1000 ml is filled with 700 ml of the selected soak solution. No more than 108 square inches of sample are soaked in the 700 ml of soaking solution, depending on specimen size. The premoistened specimens, that have equilibrated overnight, are immersed in the soak solution and then allowed to soak undisturbed for a specified time period (typically 1 hour). At the completion of the soak period, samples are carefully retrieved from the soak solution, allowed to drain, and then tested immediately as described above (i.e., the sample is immediately mounted in the tensile tester and tested, without being passed through the wringer). In cases with highly dispersible materials, the samples often cannot be retrieved from the soaking solution without falling apart. The soaked tensile values for such samples are recorded as zero for the corresponding solution.

For the deionized soaked cross-direction wet tensile test, S-CDWT, the sample is immersed in deionized water for 1 hour and then tested. For the hard-water soaked cross-direction wet tensile test, S-CDWT-M (M indicating divalent metal ions), the sample is immersed in water containing 200 ppm of Ca++/Mg++ in a 2:1 ratio prepared from calcium chloride and magnesium chloride, soaked for one hour and then tested. For the medium hard water soaked cross-direction wet tensile test, MS-CDWT-M, the sample is immersed in water containing 50 ppm of Ca++/Mg++ in a 2:1 ratio, soaked for one hour and then tested. Testing done with other time increments or soaking solutions should be so indicated to prevent confusion with the S-CDWT or S-CDWT-M tests.

In one embodiment of the present invention, wet wipes are produced using the above-described wetting composition in Table 2 and an air-laid fibrous material comprising about 80 weight percent of bleached kraft fibers and 20 weight percent of any one of the above-described ion-sensitive binder compositions of the present invention, wherein the weight percentages are based on the total weight of the dry nonwoven fabric. In a further embodiment of the present invention, wet wipes are produced using the above-described wetting composition in Table 2 and an air-laid fibrous material comprising 90 weight percent of softwood fibers and 10 weight percent of an ion-sensitive binder composition, wherein the weight percentages are based on the total weight of the dry nonwoven fabric. The amount of wetting composition added to the nonwoven fabric, relative to the weight of the dry nonwoven fabric in these embodiments, is desirably about 180 percent to about 240 weight percent.

Desirably, the wet wipes of the present invention possess an in-use wet tensile strength (CDWT) of at least 100 g/in, and a tensile strength of less than about 30 g/in after being soaked in water having a concentration of Ca2+ and/or Mg2+ ions of about 50 ppm for about one hour (MS-CDWT-M). More desirably, the wet wipes possess an in-use wet tensile strength of at least 300 g/in (CDWT), and a tensile strength of less than about 30 g/in after being soaked in water having a concentration of Ca2+ and/or Mg2+ ions of about 50 ppm for about one hour (MS-CDWT-M). In a further embodiment, the wet wipes desirably possess an in-use wet tensile strength of at least 200 g/in (CDWT), and a tensile strength of less than about 20 g/in after being soaked in water having a concentration of Ca2+ and/or Mg2+ ions of about 200 ppm for about one hour (S-CDWT-M). Even more desirably, the wet wipes possess an in-use wet tensile strength of at least 300 g/in, and a tensile strength of less than about 20 g/in after being soaked in water having a concentration of Ca2+ and/or Mg2+ ions of about 200 ppm for about one hour (S-CDWT-M).

Desirably, the wet wipes treated with the binder material of the present invention possess an in-use wet tensile strength of at least 100 g/in for a 1 inch width sample in the cross machine direction when soaked with 10% to 400% by weight wet wipes solution containing more than 1% by weight monovalent and/or divalent ion concentration and a tensile strength of less than about 30 g/in after being soaked in deionized water for about one hour. More desirably, the wet wipes treated with the binder material of the present invention possess an in-use tensile strength of at least 200 g/in for a 1 inch width sample in the cross machine direction when soaked with 10% to 400% by weight wet wipes solution containing more than 1% by weight monovalent and/or divalent ion concentration and a tensile strength of less than about 30 g/in after being soaked in deionized water for about one hour.

Products with higher basis weights or wet strengths than flushable wet wipes may have relatively higher wet tensile strength. For example, products such as pre-moistened towels or hard-surface cleaning wipes may have basis weights above 70 gsm, such as from 80 gsm to 150 gsm. Such products can have CDWT values of 500 g/in or greater, with S-CDWT values of about 150 g/in or less, more specifically about 100 g/in or less, and most specifically about 50 g/in or less, with similar ranges possible for S-CDWT-M.

Dispersibility

Prior efforts to measure dispersibility of webs, whether dry or premoistened, have commonly relied on systems in which the web was exposed to shear while in water, such as measuring the time for a web to break up while being agitated by a mechanical mixer. The constant exposure to shear offers an unrealistic and overly optimistic test for products designed to be flushed in a toilet, where the level of shear is weak and extremely brief. Once the product has passed through the neck of the toilet and entered a septic tank, shear rates may be negligible. Further, the product may not be fully wetted with water from the toilet bowl when it is flushed, or rather, there may not have been adequate time for the wetting composition of the product to have been replaced with the water of the toilet bowl when the momentary shear of flushing is applied. Thus, previous measurements of dispersibility could suggest that a product is dispersible when, in fact, it may be poorly suited for septic system.

For a realistic appraisal of dispersibility, it is believed that a relatively static measure is needed to better simulate the low shear that real products will experience once they have become fully wetted with water from the toilet. Thus, a test method for dispersibility has been developed which does not rely on shear and which provides an improved means of assessing suitability of a product for a septic system. In this method, the tensile strength of a product is measured in its original, wetted form (the CDWT measurement described above) and after the product has been soaked in a second solution for one hour (either the S-CDWT or S-CDWT-M test). The second solution can be either deionized water for determination of the "Deionized Dispersibility" value or hard water (according to the S-CDWT-M test) for determination of the "Hard Water Dispersibility" value. In either case, the Dispersibility is defined as (1 minus the ratio of the cross-direction wet tensile strength in the second solution divided by the original cross-direction wet tensile strength)* 100%. Thus, if a pre-moistened wipe loses 75% of its CD wet tensile strength after soaking in hard water for one hour, the Hard Water Dispersibility is (1-0.25)*100%=75%. The articles of the present invention can have a Deionized Dispersibility of 80% or greater, more specifically 90% or greater, specifically still 95% or greater, and can have a Deionized Dispersibility of about 100%. The articles of the present invention can have a Hard Water Dispersibility of 70% or greater, more specifically 80% or greater, specifically still about 90% or greater, and can have a Deionized Dispersibility of about 100%.

Method of Making Wet Wipes

The pre-moistened wipes of the present invention can be made in several ways. In one embodiment, the ion-sensitive polymer composition is applied to a fibrous substrate as part of an aqueous solution or suspension, wherein subsequent drying is needed to remove the water and promote binding of the fibers. In particular, during drying, the binder migrates to the crossover points of the fibers and becomes activated as a binder in those regions, thus providing acceptable strength to the substrate. For example, the following steps can be applied:

1. Providing an absorbent substrate that is not highly bonded (e.g., an unbonded airlaid, a tissue web, a carded web, fluff pulp, etc.).

2. Applying an ion-sensitive polymer composition to the substrate, typically in the form of a liquid, suspension, or foam.

3. Drying the substrate to promote bonding of the substrate. The substrate may be dried such that the peak substrate temperature does not exceed 160° C., or 140° C., or 120° C., 110° C., or 100° C. In one embodiment, the substrate temperature does not exceed 80° C. or 60° C.

4. Applying a wetting composition to the substrate.

5. Placing the wetted substrate in roll form or in a stack and packaging the product.

Application of the ion-sensitive polymer composition to the substrate can be by means of spray; by foam application; by immersion in a bath; by curtain coating; by coating and metering with a wire-wound rod; by passage of the substrate through a flooded nip; by contact with a pre-metered wetted roll coated with the binder solution; by pressing the substrate against a deformable carrier containing the ion-sensitive polymer composition such as a sponge or felt to effect transfer into the substrate; by printing such as gravure, inkjet, or flexographic printing; and any other means known in the art.

In the use of foams to apply a binder polymer, the mixture is frothed, typically with a foaming agent, and spread uniformly on the substrate, after which vacuum is applied to pull the froth through the substrate. Any known foam application method can be used, including that of U.S. Pat. No. 4,018,647, "Process for the Impregnation of a Wet Fiber Web with a Heat Sensitized Foamed Latex Binder," issued Apr. 19, 1977 to Wietsma, the entirety of which is herein incorporated by reference. Wietsma discloses a method wherein a foamed latex is heat-sensitized by the addition of a heat-sensitizer such as functional siloxane compounds including siloxane oxyalkylene block copolymers and organopolysiloxanes. Specific examples of applicable heat-sensitizers and their use thereof for the heat sensitization of latices are described in the U.S. Pat. Nos. 3,255,140; 3,255,141; 3,483,240 and 3,484,394, all of which are incorporated herein by reference. The use of a heat-sensitizer is said to result in a product having a very soft and textile-like hand compared to prior methods of applying foamed latex binders.

The amount of heat-sensitizer to be added is dependent on, interalia, the type of latex used, the desired coagulation temperature, the machine speed and the temperatures in the drying section of the machine, and will generally be in the range of about 0.05 to about 3% by weight, calculated as dry matter on the dry weight of the latex; but also larger or smaller amounts may be used. The heat sensitizer can be added in such an amount that the latex will coagulate far below the boiling point of water, for instance at a temperature in the range of 35° C. to 95° C., or from about 35° C. to 65° C.

Without wishing to be bound by theory, it is believed that a drying step after application of the binder solution and before application of the wetting composition enhances bonding of a fibrous substrate by driving the binder to fiber crossover points as moisture is driven off, thus promoting efficient use of the binder. However, in an alternative method, the drying step listed above is skipped, and the ion-sensitive polymer composition is applied to the substrate followed by application of the wetting composition without significant intermediate drying. In one version of this method, the ion-sensitive polymer composition selectively adheres to the fibers, permitting excess water to be removed in an optional pressing step without a significant loss of the binder from the substrate. In another version, no significant water removal occurs prior to application of the wetting composition. In yet another alternative method, the ion-sensitive polymer composition and the wetting composition are applied simultaneously, optionally with subsequent addition of salt or other activating compounds to activate or further activate the binder.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Preparation of Ion Sensitive Polymer

Anionic terpolymer and tetrapolymer binders were prepared with the following molar feed compositions: 5-10 mole percent 2-acrylamido-2-methyl-1-propanesulfonic acid (AMPS), 2-7 mole percent itaconic anhydride (ITA), 48-88 mole percent butyl acrylate (BA) and 15-40 mole percent methyl acrylate (MA).

The batch polymerizations were conducted in an acetone/water mixture (~90/10 by weight) with Vazo-52 initiation at 55-58 degrees Celsius in the absence of a chain transfer agent. The charged molar ratio of total monomer to Vazo-52 initiator was 345 for each polymerization. Total polymer solids during reaction ranged between 20% and 25% by weight. Temperature of the reaction mixture was maintained between 55 and 58 degrees Celsius for 6 hours. An equimolar amount of sodium hydroxide relative to the AMPS concentration was charged to the mixture. Mixing was continued for an additional 1 hour. The polymer solutions were rotoevaporated to remove the acetone and water. Deionized water was charged to the dry polymer to approximate 15%-20% solids content.

These polymers were performance tested against the primary constituent polymer [Lion SSB-6] and the commercially utilized blend of Lion SSB-6 (75%(w/w)) and poly(ethylene-vinyl acetate) (25% (w/w)) (Elite-0 from National Starch and Chemical Company).

Binder-Basesheet Preparation

A water-dispersible, wet-laid nonwoven substrate composed of rayon fibers was used as the experimental basesheet. Each sheet was cut to roughly 5.5 in (CD)×5 in (MD). A piece of release paper with basesheet was attached with adhesive plastic tape to a 8.5 in×11 in piece of sized paper. A #20 grooved, wire-wound rod was laid across the top of the basesheet. Polymer solution(1-13% solids) was poured along the rod. The rod was then rolled down the length of the basesheet. The release paper/basesheet was removed from the sized paper and placed into a forced air oven. The sample sheets were held between 170° C., 200° C. and 230° C. for 2 minutes. Each sample sheet was peeled from the release paper. If applicable, excess polymer film was gently removed from the sheet edges. The sheets were then cut into 1 in (CD)×5 in (MD) strips. Add-on levels of polymer varied between 83% and 108%.

Tensile Testing

A Synergie 200 tensile tester with Testworks 4.0 version software was utilized for all sample testing. The testing was performed using the 100 N load cell and pneumatic, rubberized grips. The gauge length was set at 2 in and the crosshead speed was 12 in/min. The wet samples were secured in the grips and stretched to failure. The peak load of each sample in the machine direction (MDWT) was recorded. A value of "0" was registered for the peak load if the sample was determined to be dispersed. Samples were considered dispersed if individual strips could not be removed from the preserving solution due to lack of structural integrity.

The in-use strength of each sample was simulated by soaking the tensile samples in the defined high salt solution. Disposal strength or dispersibility was assessed by transferring samples, which had been soaked for a minimum of 12 hours in the high salt preserving media, into a hard water simulant (200 ppm $Ca^{2+}/Mg^{2+}$) [HW] or deionized water [DI].

Table 4 below represents the behavior of the described anhydride terpolymer in divalent chloride salts and sodium chloride at similar ionic strength. The binder was applied to rayon and the composites were dried at 170° C. for 2 minutes. Results are reported as MDWT in g/in.

TABLE 4

Salt-Sensitivity of a Water-Soluble Terpolymer Composition
(10 mole % AMPS, 6 mole % ITA; 84 mole % BA) [P7746-172A]

| Sample | Add-on | Salt | In-use Strength | Hard Water | Deionized Water |
|---|---|---|---|---|---|
| P7746-172A | 90 | 4% $ZnCl_2$ | 648 ± 8 | 539 ± 85 | 437 ± 136 |
| P7746-172A | 83 | 4% $CaCl_2$ | 477 ± 10 | 61 ± 22 | 13 ± 6 |
| P7746-172A | 103 | 4% $MgCl_2$ | 301 ± 19 | 21 ± 8 | 0 |
| P7746-172A | 105 | 5.2% NaCl | 134 ± 13 | 21 ± 2 | 0 |
| SSB-6 | 100 | 5.2% NaCl | 820 ± 78 | 38 ± 8 | 0 |
| SSB-6/Elite | 95 | 4% NaCl | 851 ± 187 | 177 ± 26 | 51 ± 13 |

The terpolymer shows a high degree of sensitivity to the type of cation present within these salts as the divalent chlorides appear to provide greater in-use tensile strength versus sodium chloride. Unfortunately, for this composition, it appears that strength improvement comes at the expense of hard water dispersibility as stronger, more enduring; and less hydrated ionic complexation exists between the acidic terpolymer and the divalent cations of zinc and calcium relative to sodium. (Obviously, ionic complexation can occur at a single anhydride moiety as well as intra- or intermolecular bridging through two separate carboxylate linkages.) From the data presented in Table 4, the apparent order of ionic interaction in terms of strength and permanency is as follows: Zn>Ca>Mg>Na.

In any event, regardless of the high salt solution used, this terpolymer composition does not compare favorably with the SSB-6/Elite-0 blend on the rayon basesheet. As a result, alternative compositions have been examined with emphasis placed upon the use of $CaCl_2$ and $MgCl_2$ as preserving salt media.

A series of AMPS-ITA-BA-MA tetrapolymers were synthesized in response to the findings for the 10%AMPS/6%ITA/84%BA terpolymer described above. Relative to this composition, with the goal of attaining higher in-use strength, AMPS concentration was lowered to between 5 and 9 mole percent and the ITA concentration was raised to 7 mole percent. Simultaneously, a portion of the BA was replaced with MA in an effort to counteract the presumed loss of hard water dispersibility with a more hydrophilic acrylate as a substantial fraction of the softer sulfonate anion was removed. Table 5 below shows the results of the tensile testing of the modified polymer. The binder was applied to BFF Rayon and the composites were dried at 170° C. for 2 minutes. Results are reported as MDWT in g/in.

TABLE 5

Salt-Sensitivity of Water-Soluble, Tetrapolymer Compositions

| Sample | % AMPS | % ITA | % BA | % MA | Add-On (%) | Salt | In-Use | HW | DI |
|---|---|---|---|---|---|---|---|---|---|
| P7746-175E | 9 | 7 | 59 | 25 | 103 | 4% MgCl₂ | 350 ± 70 | 46 ± 2 | 0 |
| P7746-175E | 9 | 7 | 59 | 25 | 103 | 4% CaCl₂ | 576 ± 67 | 69 ± 15 | 0 |
| P7746-176D | 7 | 7 | 61 | 25 | 108 | 4% MgCl₂ | 552 ± 62 | 70 ± 8 | 0 |
| P7746-176D | 7 | 7 | 61 | 25 | 108 | 4% CaCl₂ | 869 ± 55 | 164 ± 43 | 0 |
| P7746-178E | 5 | 7 | 48 | 40 | 97 | 4% MgCl₂ | 409 ± 28 | 49 ± 3 | 38 ± 11 |
| P7746-178E | 5 | 7 | 48 | 40 | 97 | 4% CaCl₂ | 946 ± 44 | 787 ± 14 | 668 ± 79 |
| SSB-6/Elite | | 75/25 Blend | | | 95 | 4% NaCl | 851 ± 187 | 177 ± 26 | 51 ± 13 |

TABLE 6

Sensitivity of Water-Soluble, Tetrapolymer Compositions to Reduced Salt Concentrations

| | | | | | | | MDWT (g/in) [Rayon] | | |
|---|---|---|---|---|---|---|---|---|---|
| Sample | % AMPS | % ITA | % BA | % MA | Add-on (%) | Salt | In-Use | HW | DI |
| P7746-184A | 7 | 7 | 56 | 30 | 120 | 0.5% CaCl₂ | 746 ± 8 | 43 ± 22 | 0 |
| P7746-184A | 7 | 7 | 56 | 30 | 106 | 4% CaCl₂ | 845 ± 26 | 210 ± 25 | 120 ± 74 |
| P7746-184D | 8 | 7 | 60 | 25 | 113 | 0.5% CaCl₂ | 480 ± 47 | 0 | 0 |
| P7746-184D | 8 | 7 | 60 | 25 | 96 | 4% CaCl₂ | 817 ± 75 | 167 ± 40 | 0 |
| SSB/Elite | | 75/25 | | | 95 | 4% NaCl | 851 ± 187 | 177 ± 26 | 51 ± 13 |

As indicated in Tables 6 and 7 above, the experimental variants proved to be successful as in-use strength and dispersibility approach the levels seen with the SSB-6/Elite-0 blend. This is most evident with samples P7746-176D and P7746-184A preserved in varying ionic strength CaCl₂ (0.5 and 4% solutions).

Samples P7746-103B, P7746-103C and SSB-6/Elite-0 were exposed to a thermal cure study in order to explore whether or not higher in-use strengths can be induced while maintaining attractive hard water dispersibility through formation and activation of cyclic anhydride intermediates. The results are shown in Table 7 below.

TABLE 7

Effect of Temperature on In-Use Strength

| Sample | % AMPS | % ITA | % BA/EHA | % Acrylic Acid | Cure T (° C.) | Relative Strength Ratios (4% NaCl/HW/DI) |
|---|---|---|---|---|---|---|
| P7746-103B | 10 | 4 | 86/0 | 0 | 170 | 100/27/7 |
| P7746-103B | 10 | 4 | 86/0 | 0 | 200 | 100/53/5 |
| P7746-103B | 10 | 4 | 86/0 | 0 | 230 | 100/68/8 |
| P7746-103C | 10 | 6 | 84/0 | 0 | 170 | 100/0/0 |
| P7746-103C | 10 | 6 | 84/0 | 0 | 200 | 100/55/42 |
| P7746-103C | 10 | 6 | 84/0 | 0 | 230 | 100/67/33 |
| SSB-6 | 4 | 0 | 22.5/10.5 | 63 | 170 | 100/4/0 |
| SSB-6 | 4 | 0 | 22.5/10.5 | 63 | 200 | 100/95/78 |
| SSB-6 | 4 | 0 | 22.5/10.5 | 63 | 230 | 100/94/96 |

The effect of temperature seems to be far more dramatic for SSB-6/Elite-0 versus the experimental anhydride terpolymers since residual strength in hard water simulant and deionized water do not deviate significantly from augmented strength values seen in 4% NaCl as the binder-basesheet composites are heated to 200° C. and 230° C. In theory, this trend may be attributed to the more numerous anhydride intermediates that can evolve within the SSB-6/Elite-0 polymer (from adjacent acrylic acid units) in comparison to P7746-103B and P7746-103C. Consequently, esterification and crosslinking reactions with the cellulose substrate are potentially more abundant with the SSB-6/Elite-0.

However, without a definitive characterization method that defines the presence and frequency of such reactions, the anhydride intermediate can only be mentioned as a possible contributor to the observed effect. Other factors such as binder hydrophobicity, basesheet density, basesheet porosity, pH, add-on, dry time, binder-basesheet contact time, binder stiffness and preserving media should also be considered.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A nonwoven fabric comprising fibrous material and a binder material, wherein the binder material comprises an ion-sensitive polymer comprising the polymerization product of about 5 to about 10 mol percent of 2-acrylamido-2-methyl-1-propanesulfonic acid, one or more about 83 to about 93 mole percent alkyl acrylates and about 2 to about 7 mole percent of an anhydride/dicarboxylate selected from itaconic anhydride, crotonic anhydride, and fumaric anhydride, wherein the ion-sensitive polymer is dispersible and soluble in water; and wherein the fabric has an in-use tensile strength of at least 100 g/in after being soaked in a wetting solution containing more than 1% by weight monovalent and/or divalent ion concentration and less than about 10 weight percent of organic solvents, and a tensile strength of less than about 30 g/in after being soaked in water having a concentration of $Ca^{2+}$ and/or $Mg^{2+}$ ions of about 50 ppm for about one hour.

2. The nonwoven fabric of claim 1, wherein the polymerization product is formed from a mixture of monomers,
the mixture of monomers comprising from about 5 to about 10 mol % 2-acrylamido-2-methyl-1-propanesulfonic acid; from about 83 to about 93 mol % alkyl acrylate; and from about 2 to about 7 mol % itaconic anhydride.

3. The nonwoven fabric of claim 1, wherein the polymerization product comprises from about 5 to about 10 mole percent 2-acrylamido-2-methyl-1-propanesulfonic acid, about 48 to about 88 mole percent butyl acrylate, about 25 to about 40 mole percent methyl acrylate, and about 2 to about 7 mole percent itaconic anhydride.

4. The nonwoven fabric of claim 1, wherein the ion-sensitive polymerization product is formed by a solution polymerization process.

5. The nonwoven fabric of claim 2, wherein the ion-sensitive polymerization product is formed by a solution polymerization process.

6. The nonwoven fabric of claim 1, wherein the ion-sensitive polymer is insoluble in an aqueous salt solution containing from about 1 weight percent to about 3.0 weight percent of one or more inorganic and/or organic salts containing monovalent and/or divalent ions.

7. A nonwoven fabric comprising fibrous material and a binder material, wherein the binder material comprises an ion-sensitive polymer comprising the polymerization product of about 5 to about 10 mol percent of 2-acrylamido-2-methyl-1-propanesulfonic acid, about 48 to about 88 mole percent butyl acrylate, about 15 to about 40% methyl acrylate and about 3 to about 5 mole percent of itaconic anhydride, wherein the ion-sensitive polymer is dispersible and soluble in water; and wherein the fabric has an in-use tensile strength of at least 100 g/in after being soaked in a wetting solution containing more than 1% by weight monovalent and/or divalent ion concentration and less than about 10 weight percent of organic solvents, and a tensile strength of less than about 30 g/in after being soaked in water having a concentration of $Ca^{2+}$ and/or $Mg^{2+}$ ions of about 50 ppm for about one hour.

8. The nonwoven fabric of claim 7, wherein the binder material comprises an ion-sensitive polymer comprising the polymerization product of about 5 mol % percent of 2-acrylamido-2-methyl-1-propanesulfonic acid, about 48 to about 88 mole percent butyl acrylate, about 15 to about 40% methyl acrylate and about 3 to about 5 mole percent of itaconic anhydride.

9. The nonwoven fabric of claim 7, wherein the binder material comprises an ion-sensitive polymer comprising the polymerization product of about 5 to about 10 mol percent of 2-acrylamido-2-methyl-1-propanesulfonic acid, about 48 to about 61 mole percent butyl acrylate, about 25 to about 40% methyl acrylate and about 2 to about 7 mole percent of itaconic anhydride.

10. The nonwoven fabric of claim 7, wherein the polymerization product comprises from about 5 to about 10 mole percent 2-acrylamido-2-methyl-1-propanesulfonic acid, about 48 to about 61 mole percent butyl acrylate, about 25 to about 40% methyl acrylate, and about 2 to about 7 mole percent itaconic anhydride.

* * * * *

UNITED STATES PATENT AND TRADEMARK OFFICE
CERTIFICATE OF CORRECTION

PATENT NO. : 7,772,138 B2
APPLICATION NO. : 10/153232
DATED : May 21, 2002
INVENTOR(S) : Michael R. Lostocco et al.

It is certified that error appears in the above-identified patent and that said Letters Patent is hereby corrected as shown below:

Claim 1, col. 33, line 26 is amended to read:

1. A nonwoven fabric comprising fibrous material and a binder material, wherein the binder material comprises an ion-sensitive polymer comprising the polymerization product of about 5 to about 10 mol percent of 2-acrylamido-2-methyl-1-propanesulfonic acid, about 48 to about 88 mole percent butyl acrylate, about 25 to about 40 mol percent methyl acrylate and about 2 to about 7 mol percent of an anhydride/dicarboxylate selected from itaconic anhydride, crotonic anhydride, and fumaric anhydride, wherein the ion-sensitive polymer is dispersible and soluble in water; and wherein the fabric has an in-use tensile strength of at least 100 g/in after being soaked in a wetting solution containing more than 1% by weight monovalent and/or divalent ion concentration and less than about 10 weight percent of organic solvents, and a tensile strength of less than about 30 g/in after being soaked in water having a concentration of $Ca^{2+}$ and/or $Mg^{2+}$ ions of about 50 ppm for about one hour.

Signed and Sealed this
Thirtieth Day of August, 2011

David J. Kappos
*Director of the United States Patent and Trademark Office*